United States Patent
Cherian et al.

(10) Patent No.: US 11,343,853 B2
(45) Date of Patent: May 24, 2022

(54) SHARING A TRANSMISSION OPPORTUNITY OF A WIRELESS COMMUNICATION MEDIUM

(71) Applicant: QUALCOMM Incorporated, San Diego, CA (US)

(72) Inventors: George Cherian, San Diego, CA (US); Maarten Menzo Wentink, Nijmegen (NL); Abhishek Pramod Patil, San Diego, CA (US); Alfred Asterjadhi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 176 days.

(21) Appl. No.: 16/790,624

(22) Filed: Feb. 13, 2020

(65) Prior Publication Data

US 2020/0260488 A1 Aug. 13, 2020

Related U.S. Application Data

(60) Provisional application No. 62/805,087, filed on Feb. 13, 2019.

(51) Int. Cl.
*H04W 74/08* (2009.01)
*H04W 56/00* (2009.01)
*H04W 84/12* (2009.01)

(52) U.S. Cl.
CPC ..... *H04W 74/0808* (2013.01); *H04W 56/001* (2013.01); *H04W 84/12* (2013.01)

(58) Field of Classification Search
CPC ........... H04W 74/0808; H04W 56/001; H04W 84/12; H04W 74/04

USPC .................................................. 370/329, 252
See application file for complete search history.

(56) References Cited

U.S. PATENT DOCUMENTS

| | | | | |
|---|---|---|---|---|
| 2011/0255618 A1* | 10/2011 | Zhu | ....................... | H04W 72/12 375/260 |
| 2014/0119288 A1* | 5/2014 | Zhu | ................... | H04W 72/0406 370/329 |
| 2015/0063128 A1* | 3/2015 | Garikipati | ............ | H04B 7/0452 370/252 |
| 2015/0117369 A1* | 4/2015 | Merlin | .............. | H04W 74/0816 370/329 |

(Continued)

*Primary Examiner* — Kwang B Yao
*Assistant Examiner* — Syed M Bokhari
(74) *Attorney, Agent, or Firm* — DeLizio Law, PLLC

(57) ABSTRACT

This disclosure provides systems, devices, apparatus and methods, including computer programs encoded on storage media, for sharing a transmission opportunity (TXOP) of a wireless channel. A first wireless local area network (WLAN) device can win a contention-based procedure to become an owner of the TXOP and determine to use the TXOP as a multi-device transmission opportunity (mTXOP). Although the first WLAN device is the owner of the mTXOP, the first WLAN device may allocate resources from the mTXOP to share with other WLAN devices. During a first portion of the mTXOP, the first WLAN device allocate subordinate transmission opportunities (sub-TXOPs) for use by other WLAN devices during a second portion of the mTXOP. The allocation of sub-TXOPs may be prepared based on fairness considerations, latency considerations, or both. In some implementations, a sub-TXOP may be allocated for a non-WLAN device, such as a wireless wide area network (WWAN) apparatus.

30 Claims, 19 Drawing Sheets

(56) References Cited

U.S. PATENT DOCUMENTS

| | | | |
|---|---|---|---|
| 2016/0269087 A1* | 9/2016 | Subramanian | H04B 7/024 |
| 2017/0006541 A1* | 1/2017 | Huang | H04W 74/006 |
| 2018/0049242 A1* | 2/2018 | Viger | H04W 72/0446 |
| 2018/0227944 A1* | 8/2018 | Yerramalli | H04W 72/042 |
| 2019/0014481 A1* | 1/2019 | Yerramalli | H04W 74/0808 |
| 2019/0021105 A1* | 1/2019 | Hamidi-Sepehr | H04W 72/1268 |

* cited by examiner

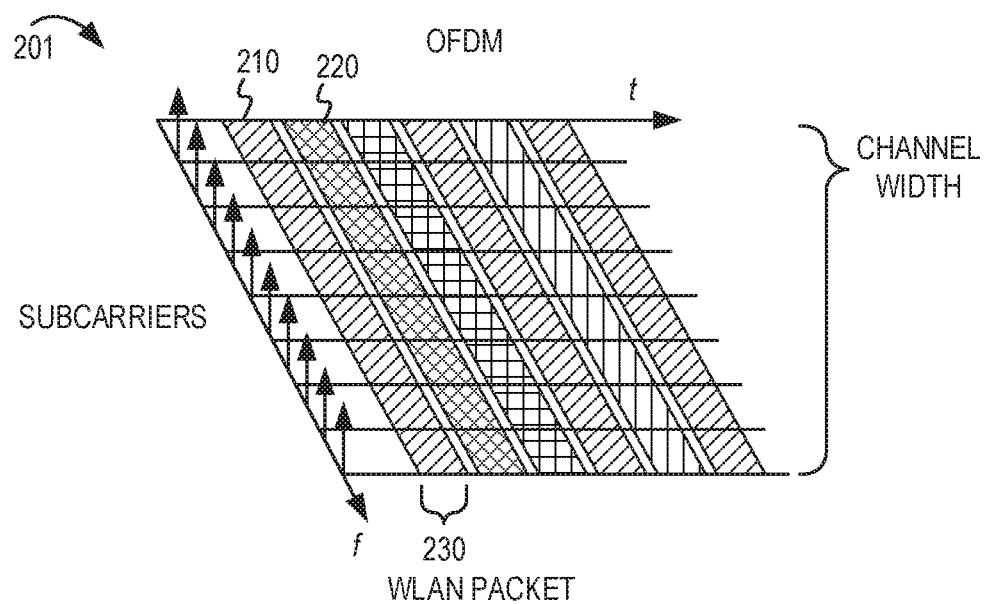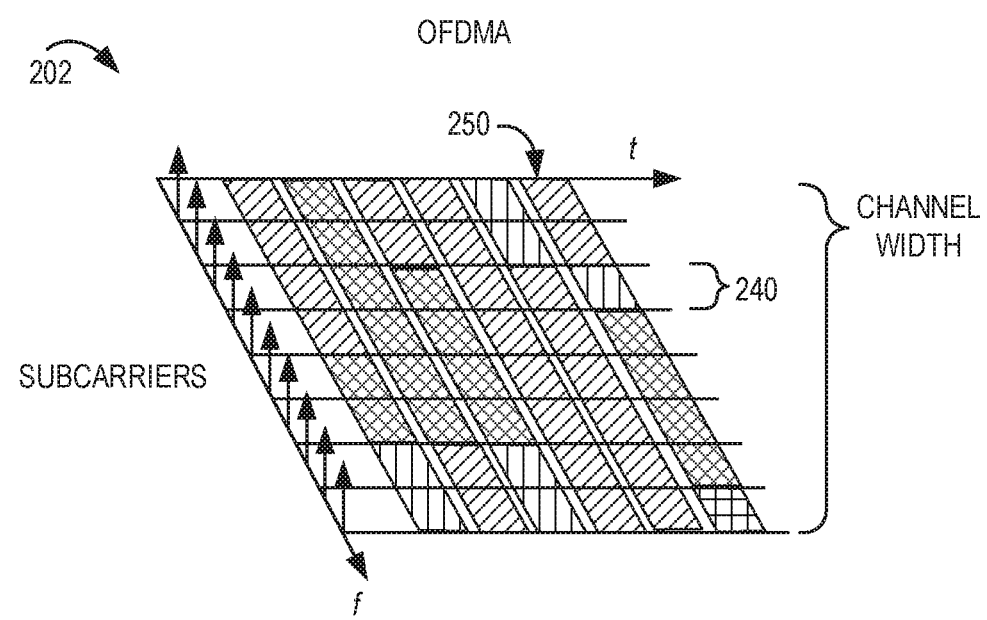
FIGURE 2

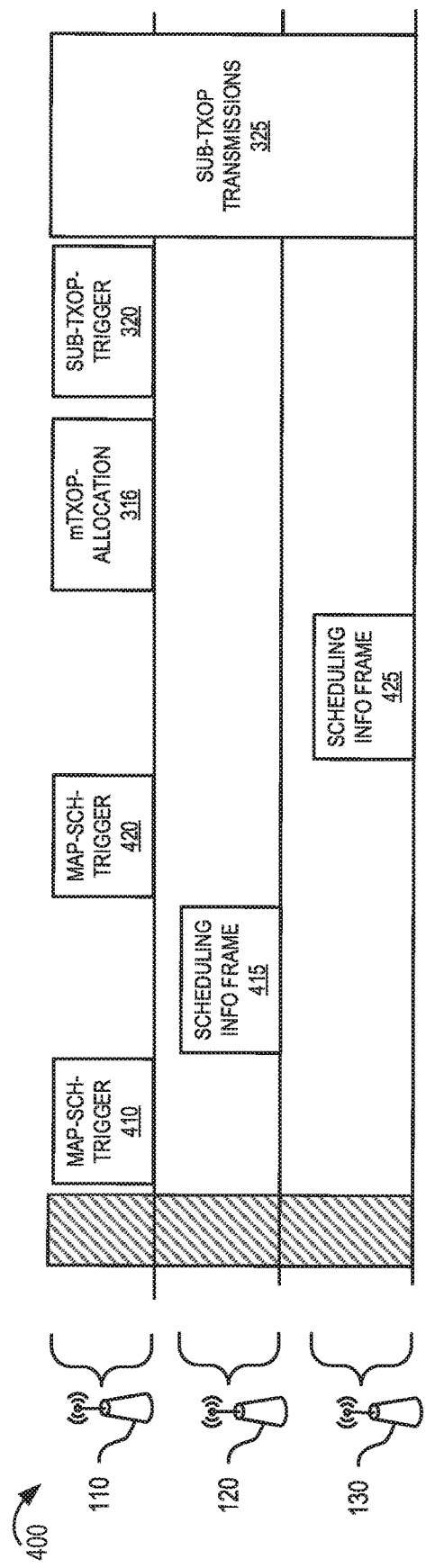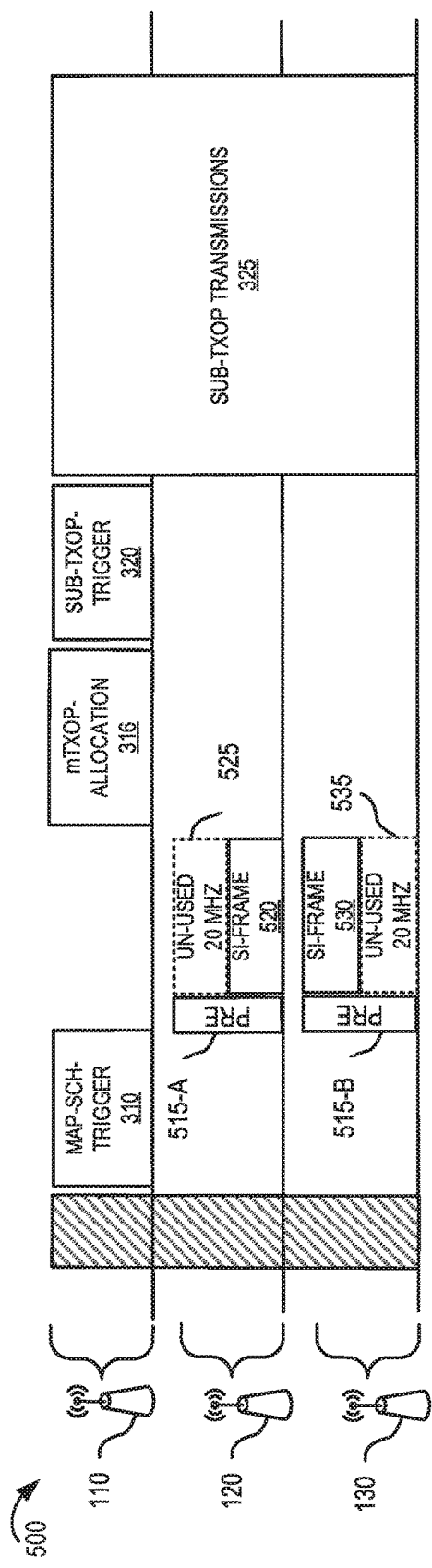

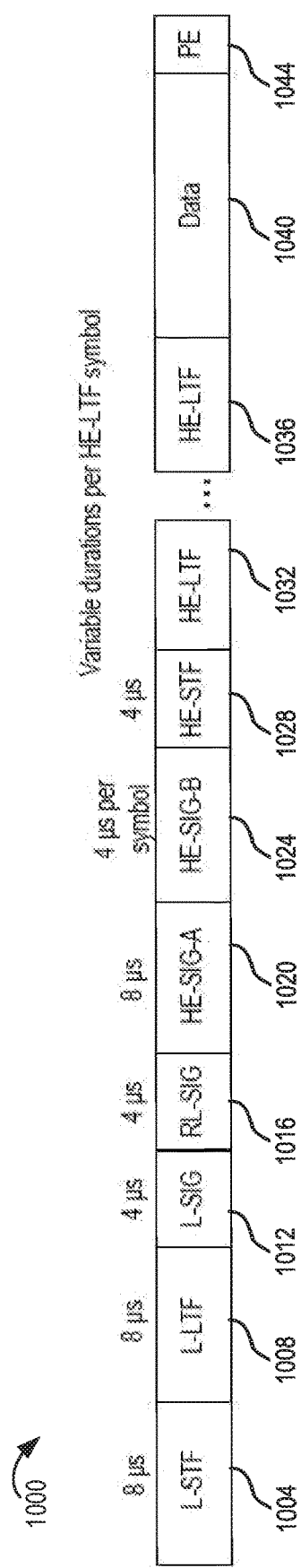
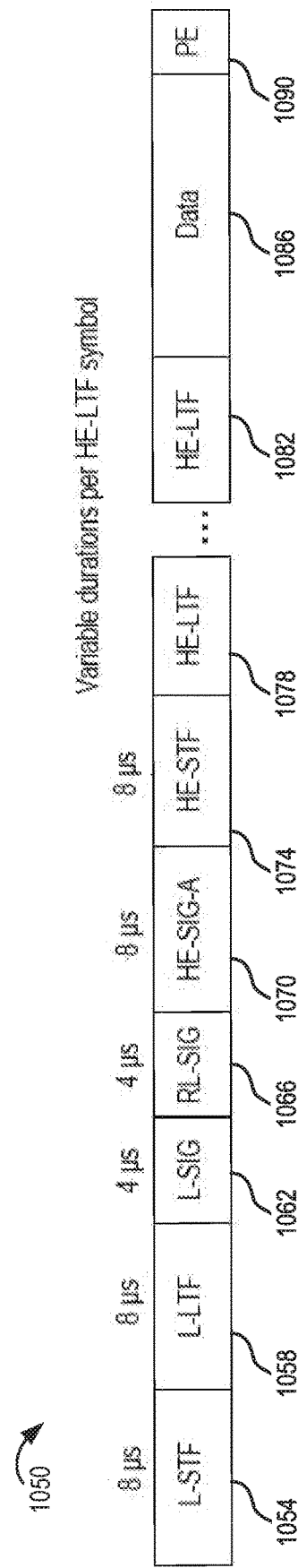
FIGURE 10A
FIGURE 10B

1600

1610 — RECEIVE, DURING A FIRST PORTION OF A FIRST MULTI-DEVICE TRANSMISSION OPPORTUNITY (mTXOP), AN ALLOCATION OF A FIRST SUBORDINATE TRANSMISSION OPPORTUNITY (SUB-TXOP) WITHIN A SECOND PORTION OF THE FIRST mTXOP

1620 — COMMUNICATE WITH THE FIRST AP DURING THE FIRST SUB-TXOP

FIGURE 16

SHARING A TRANSMISSION OPPORTUNITY OF A WIRELESS COMMUNICATION MEDIUM

CROSS-REFERENCE TO RELATED APPLICATIONS

This patent application claims priority to U.S. Provisional Patent Application No. 62/805,087 filed Feb. 13, 2019, entitled "SHARING A TRANSMISSION OPPORTUNITY OF A WIRELESS COMMUNICATION MEDIUM," and assigned to the assignee hereof. The disclosure of the prior application is considered part of and is incorporated by reference in this patent application.

TECHNICAL FIELD

This disclosure generally relates to the field of wireless communication, and more particularly to sharing a multi-device transmission opportunity of a wireless communication medium.

DESCRIPTION OF THE RELATED TECHNOLOGY

A wireless local area network (WLAN) may be formed by two or more WLAN devices (which may be referred to as stations, STAs) that share a wireless communication medium using common service settings. One or more of the WLAN devices (which may be referred to as an access point, AP) may establish the common service settings. An AP is a type of STA that performs a distribution system access function in the WLAN. For example, the AP may be coupled to a network, such as the Internet, and may enable another WLAN device (such as a non-AP STA) to communicate via the network (or communicate with other WLAN devices coupled to the AP). The basic building block of a WLAN conforming to the Institute of Electrical and Electronics Engineers (IEEE) 802.11 family of standards is a Basic Service Set (BSS), which is managed by an AP. A BSS may be identified by a service set identifier (SSID) that is advertised by the AP. An AP periodically broadcasts beacon frames to enable other STAs within wireless range of the AP to establish or maintain a communication link with the WLAN. A STA may have a wireless connection (referred to as a wireless association, or just "association") when it has authenticated and established a wireless session with the AP. One or more STAs in the WLAN may utilize the shared wireless communication medium to communicate with the AP. The AP may have an opportunity to influence the distribution of resources available in the shared wireless communication medium.

As more WLANs are deployed in an environment, the wireless communication may be shared by multiple WLAN devices. For example, a first BSS (managed by a first AP) may utilize a first wireless channel. A second BSS (managed by a second AP) also may utilize the same first wireless channel for separate communications unrelated to the first BSS. The second BSS may be referred to as an overlapping BSS (OBSS) in relation to the first BSS. It may be desirable to coordinate communication by multiple BSSs in an environment to increase spectral efficiency and quality of service for the WLAN devices in their respective BSSs. Furthermore, as WLAN devices share an unlicensed frequency band with other unmanaged networks or even other technologies, it is desirable to efficiently and fairly share the wireless communication medium.

SUMMARY

The systems, methods, and devices of this disclosure each have several innovative aspects, no single one of which is solely responsible for the desirable attributes disclosed herein.

Another innovative aspect of the subject matter described in this disclosure can be implemented in a wireless device. In some implementations, the wireless device may be a first WLAN device. The wireless device may include an interface and at least one processor. The processor may cause the wireless device to implement any of the methods in this disclosure.

Another innovative aspect of the subject matter described in this disclosure can be implemented in a tangible computer-readable storage medium that includes non-transitory processor-executable code which, when executed by at least one processor of a wireless device, may cause the wireless device to implement any of the methods in this disclosure.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 2 shows conceptual diagrams of orthogonal frequency division multiplexing (OFDM) and orthogonal frequency division multiple access (OFDMA) to illustrate resource assignments of a wireless channel.

FIG. 4 illustrates an example of a multi-device allocation phase in a first portion of the mTXOP.

FIG. 5 illustrates an example of gathering scheduling information from multiple access points (APs) in a first portion of the mTXOP.

FIG. 10A illustrates an example of a multi-device physical protocol data unit.

FIG. 10B illustrates another example of a multi-device physical protocol data unit.

FIG. 16 shows a flowchart illustrating an example process for mTXOP sharing performed by a STA associated with an mTXOP owner.

Like reference numbers and designations in the various drawings indicate like elements.

DETAILED DESCRIPTION

Figure 1:
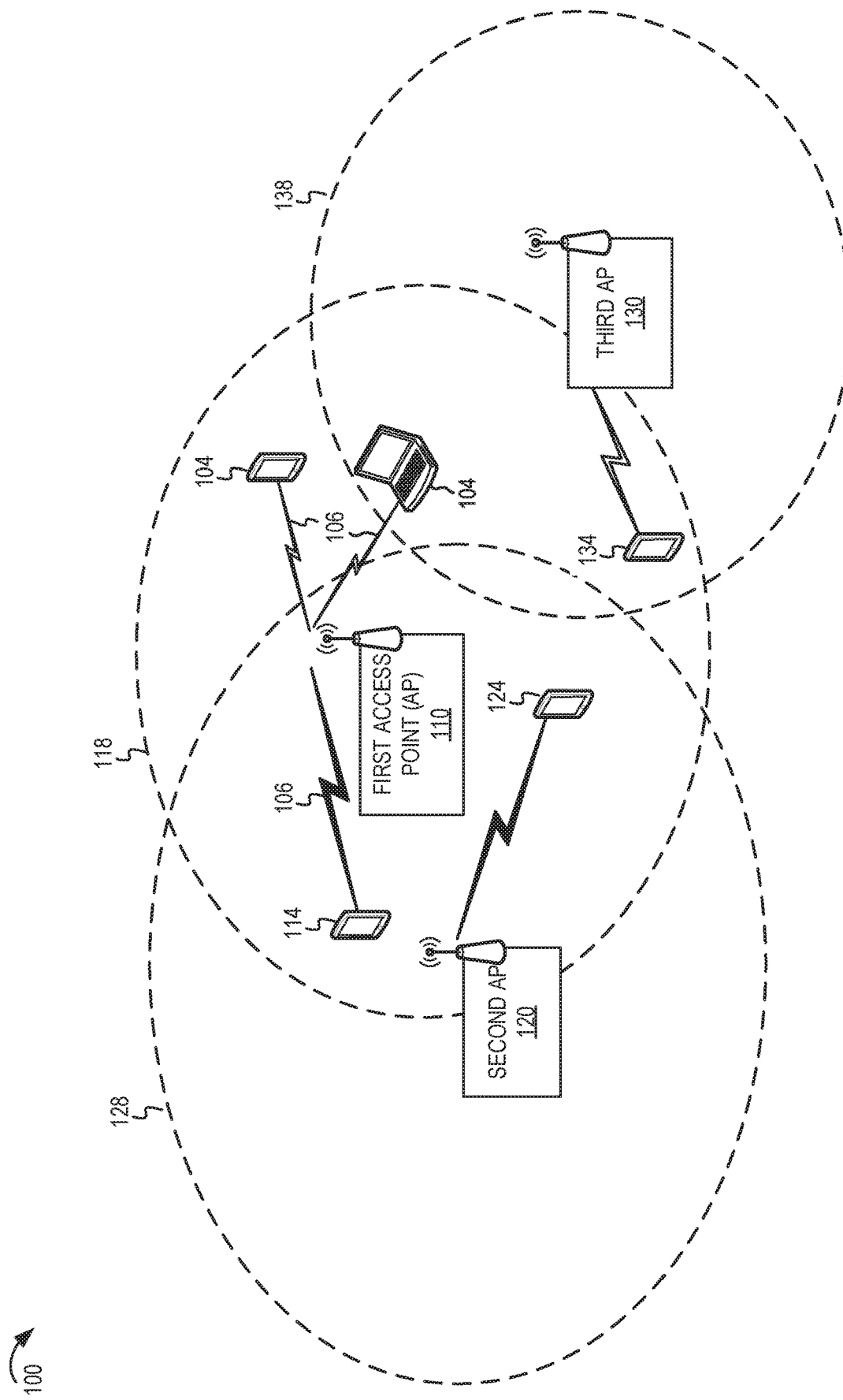
FIG. 1 shows a pictorial diagram of multiple wireless local area networks (WLANs) that may use a multi-device transmission opportunity (mTXOP) according to some implementations.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G standards, among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal frequency division multiple access (OFDMA), single-user (SU) multiple-input-multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

A wireless local area network (WLAN, sometimes also referred to as a Wi-Fi™ network) in a home, apartment, business, or other area may include one or more WLAN devices. Each WLAN device may have a station (STA) interface which is an addressable entity that shares a wireless communication medium with other STAs. An access point (AP) is a WLAN device that includes a STA interface as well as a distribution system access function. For brevity in this disclosure, the WLAN devices may be referred to as an AP or a STA to distinguish the WLAN device's functional role in a WLAN. The basic building block of a WLAN is a Basic Service Set (BSS), which is managed by an AP and includes one or more STAs associated with the AP. For brevity in this disclosure, the first WLAN includes the first AP and a first STA associated with the first AP, while the second WLAN includes the second AP and a second STA associated with the second AP. The first WLAN may be referred to as a first BSS and the second WLAN may be referred to as a second BSS (or overlapping BSS, OBSS). Multiple APs may form an extended service set (ESS) that includes multiple connected BSSs.

Various implementations of this disclosure generally relate to sharing a multi-device transmission opportunity (mTXOP) of a wireless channel. In some aspects of the disclosure, a scheme for mTXOP sharing is provided, in which a first WLAN device may gain channel access and become an owner of a mTXOP. An owner (which also may be referred to as a mTXOP scheduler, controller, leader, master, central AP, or other term) of a transmission opportunity refers to a temporary authority over the utilization of an mTXOP which lasts for a duration of the mTXOP. There may be a variety of procedures or techniques for determining ownership of an mTXOP. In some implementations, ownership of an mTXOP may be obtained when a device wins a contention-based procedure to become the owner of the mTXOP. Contention-based procedures may be performed during contention windows that are synchronized among neighboring devices. The first WLAN device may be an AP, a network controller, a STA, or other type of device configured to communicate via the wireless channel during a transmission opportunity. For brevity in this disclosure, the examples consistently use the first AP as the owner of a first mTXOP and the second AP as a neighboring AP. In other examples (such as a different mTXOP), the second AP may be the mTXOP owner. As the mTXOP owner, the first AP may coordinate with a second AP to allow both the first AP and the second AP to share the wireless channel during the first mTXOP. The first mTXOP may be divided into a plurality of subordinate transmission opportunities (sub-TXOPs) that are allocated by the owner of the first mTXOP. An allocation of the sub-TXOPs may be communicated during a first portion of the first mTXOP. In some examples of this disclosure, the sub-TXOPs may represent a time-division multiplexing schedule for a second portion of the first mTXOP. In other examples, the sub-TXOPs may represent frequency division (based on concurrent use of different sub-channel resources) or resource unit allocations of a wireless channel.

In some implementations, a first AP (as the owner of the first mTXOP) may allocate sub-TXOPs within the first mTXOP based on scheduling information from neighboring APs. For example, the first AP may solicit scheduling information from neighboring APs. The scheduling information may include parameters such as a back-off counter, buffer status information, a resource request, a latency parameter, a preferred sub-TXOP duration, or any combination thereof. The first AP may allocate the sub-TXOPs to fairly distribute the mTXOP among the neighboring APs. The fair distribution may be based on a comparison of the scheduling information from the neighboring APs. For example, the first AP (as the mTXOP owner) may allocate more time (or earlier sub-TXOPs) for a first neighboring AP that has a lower back-off counter than a second neighboring AP with a higher back-off counter. This example distribution may be considered fair since the first neighboring AP with lower back-off would have counted down before the second neighboring AP with a higher counter. In another example, the first AP (as the mTXOP owner) may consider latency or buffer size when prioritizing which neighbor AP(s) to allocate sub-TXOPs in the mTXOP. Other factors may be considered to prioritize neighbor APs in the mTXOP. For example, a first neighboring AP that is part of the same ESS (or TXOP sharing cluster) may be given a higher priority than a second neighboring AP that is not part of the same ESS. Other criteria could be used to determine a fair distribution of sub-TXOPs within the mTXOP.

In some implementations, the mTXOP may be longer than a traditional TXOP. For example, a traditional TXOP may be 5-8 milliseconds, while an mTXOP may be 10-20 milliseconds. In some implementations, the duration of an mTXOP may be a multiple of the duration associated with a traditional TXOP for a single AP. Having a longer mTXOP may be enable efficient use of a wireless channel by reducing time associated with contention-based access. The mTXOP with allocated sub-TXOPs may enable a hybrid implementation that benefits from the advantages of contention-based access and scheduled access. Contention windows may occur at predetermined times that are synchronized among neighboring devices. Following the contention window, the mTXOP owner that wins the contention-based procedure may communicate an allocation (such as a schedule) for the mTXOP during a first portion of the mTXOP. The neighboring APs, stations, and even non-WLAN devices may observe the first portion of the TXOP to determine the allocation for the mTXOP. Based on the allocation, STAs or non-WLAN devices may sleep during at least some of the second portion of the mTXOP which has sub-TXOPs that are not relevant to those devices. Furthermore, the STAs, neighboring APs, or non-WLAN devices may wake for sub-TXOPs which are allocated for them, or for the next contention window. In some implementations, the allocation may also identify the mTXOP owner. For example, devices (such as neighboring AP, STAs, or non-WLAN devices) may observe the allocations to determine whether the mTXOP owner is an AP or a non-WLAN device, whether the mTXOP owner is part of the same network system (such as an ESS or TXOP cluster) as its associated AP. Historical patterns also may be used by devices to determine whether the mTXOP owner is likely to share part of the mTXOP with particular APs. For example, a device could maintain a history of how often the winning device (mTXOP owner) has shared part of the mTXOPs it has won with its BSS.

In some implementations, a neighboring AP (such as a second AP) may have a latency consideration associated with a media stream. For example, the second AP may have media content (voice, video, or multimedia) associated with a media stream that has a low latency requirement. The first AP (as the mTXOP owner) may allocate more than one non-consecutive sub-TXOP for the second AP. For example, the first AP may distribute multiple short duration sub-TXOPs for the second AP within the mTXOP to accommodate the media stream. During the allocation phase in the first portion of the mTXOP, the second AP may communicate the latency consideration to the first AP so that the first AP can allocate the sub-TXOPs accordingly.

In some implementations, the synchronized contention windows and mTXOPs can enable coordination between devices of different wireless technologies. For example, WLAN devices and non-WLAN devices (such as long-term evolution, LTE, devices) may share a wireless channel. The WLAN devices and non-WLAN devices may contend for ownership of the mTXOPs. The allocation phase of the mTXOP may use a messaging format that can be decoded by WLAN and non-WLAN devices such that the WLAN and non-WLAN devices can determine an ownership and allocation for the mTXOP. In some implementations, an mTXOP owner may allocate a sub-TXOP for devices of a different communication technology. For example, a WLAN device may allocate a sub-TXOP within the mTXOP for use by an LTE device, or vice versa.

In some implementations, a sub-TXOP may be allocated for opportunistic uplink access by stations. For example, a sub-TXOP may be reserved for any STAs that have uplink data to transmit to their respective AP. In some implementations, the sub-TXOP for opportunistic uplink access may indicate a subset of STAs identified by a BSS identifier, STA identifiers, or the like. Such opportunistic access also may be referred to as a random access (RA) slot where any device (such as a neighboring AP, STA, or non-WLAN device) may contend for the medium for the duration of the sub-TXOP. When the mTXOP has a long duration, the availability of a sub-TXOP for opportunistic access may provide an opportunity for other devices to contend for the medium if they have latency sensitive traffic. In some systems, such opportunistic access sub-TXOPs (RA slot) may be available at fixed intervals (periodically) for certain duration (sub-TXOP size).

Particular implementations of the subject matter described in this disclosure can be implemented to realize one or more of the following potential advantages. A first AP (as mTXOP owner) of a first WLAN may allocate sub-TXOPs to fairly share a second portion of the mTXOP with neighboring devices. Neighboring devices can share parameters which enable the mTXOP owner to determine a fair allocation for the mTXOP to be shared by multiple devices. Synchronization of contention windows and mTXOPs may facilitate STAs, neighboring APs, and non-WLAN devices to determine the allocation for each mTXOP. Power saving may be realized by devices entering a sleep state during sub-TXOPs that are not relevant to them.

FIG. 1 shows a pictorial diagram of multiple WLANs that may use an mTXOP according to some implementations. FIG. 1 includes a system diagram 100 of an environment that has more than one WLAN operating overlapping coverage areas. A first WLAN may be managed by a first AP 110 that establishes a first BSS. Similarly, a second first WLAN may be managed by a second AP 120 that establishes a second BSS and a third WLAN may be managed by a third AP 130 that establishes a third BSS. Each WLAN may be a network implementing at least one of the IEEE 802.11 family of standards (such as that defined by the IEEE 802.11-2016 specification or amendments thereof). Each WLAN may provide access to other networks (not shown). For example, the AP 110 may be connected to a gateway device (not shown) which provides connectivity to another network (not shown). Each WLAN may include numerous wireless communication devices such as an AP and multiple STAs. Each of the STAs also may be referred to as a mobile station (MS), a mobile device, a mobile handset, a wireless handset, an access terminal (AT), a user equipment (UE), a subscriber station (SS), or a subscriber unit, among other possibilities. The STAs may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities. In the example of FIG. 1, the first AP 110 may have multiple STAs 104 and 114 that have a wireless association with the first AP 110. While the first AP 110 is described as an access point using an infrastructure mode, in some implementations, the first AP 110 may be a STA which is operating as an AP. For example, the first AP 110 may be a STA capable of operating in a peer-to-peer mode or independent mode. In other examples, the first AP 110 may be a software AP (SoftAP) operating on a computer system.

A single AP and its associated STAs may be referred to as a basic service set (BSS), which is managed by the respective AP. In the example of FIG. 1, the first BSS includes the first AP 110 and a first STA 114. The second BSS includes the second AP 120 and a second STA 124. The third BSS includes the third AP 130 and a third STA 134. It is noted that the locations of the STAs 104, 114, 124, 134 in FIG. 1 are arbitrarily illustrated as an example. The STAs 104, 114, 124, 134 may have different positions in relation to their associated APs. The STAs 104, 114, 124, 134 may be mobile and change position over time. As shown in FIG. 1, the associated STA may be closer to a different AP than the AP to which it is associated. For example, the first STA 114 may be closer to the second AP 120 even though the first STA 114 is wirelessly associated with the first AP 110. An "unassociated STA" may not be considered part of the BSS because they do not have a wireless session established at the AP. The BSS is identified by a service set identifier (SSID) that is advertised by the AP. The AP may periodically broadcast beacon frames ("beacons") to enable any STAs within wireless range of the AP 110 to establish or maintain a respective communication link 106 (hereinafter also referred to as a "Wi-Fi link" or "wireless association") with the AP. The various STAs in the WLAN can communicate with external networks as well as with one another via the AP 110 and respective communication links 106. To establish a communication link 106 with an AP 110, each of the STAs is configured to perform passive or active scanning operations ("scans") on frequency channels in one or more frequency bands (for example, the 2.4 GHz, 5 GHz, 6 GHz or 60 GHz bands). To perform passive scanning, a STA listens for beacons, which are transmitted by respective APs 110 at a periodic time interval referred to as the target beacon transmission time (TBTT) (measured in time units (TUs) where one TU is equal to 1024 microseconds (s)). To perform active scanning, a STA 104 generates and sequentially transmits probe requests on each channel to be scanned and listens for probe responses from APs 110. Each STA 104 may be configured to identify or select an AP 110 with which to associate based on the scanning information obtained through the passive or active scans, and to perform authentication and association operations to establish a Wi-Fi link with the selected AP.

FIG. 1 additionally shows an example coverage area 118 of the AP 110, which may represent a basic service area (BSA) of the first WLAN. An example coverage area 128 of the second AP 120 may form a BSA of the second WLAN and an example coverage area 138 of the 130 may form a BSA of the third WLAN. As a result of the increasing ubiquity of wireless networks, a STA may have the opportunity to select one of many BSSs within range of the STA or select among multiple APs that together form an extended service set (ESS) including multiple connected BSSs.

The APs and STAs in each WLAN may function and communicate (via respective communication links, such as communication links 106 in the first WLAN) according to the IEEE 802.11 family of standards (such as that defined by the IEEE 802.11-2016 specification or amendments thereof including, but not limited to, 802.11aa, 802.11ah, 802.11aq, 802.11ay, 802.11ax, 802.11az, and 802.11ba). These standards define the WLAN radio and baseband protocols for the physical (PHY) and medium access control (MAC) layers. The APs and STAs transmit and receive frames (hereinafter also referred to as "Wi-Fi communications") to and from one another in the form of physical layer convergence protocol (PLCP) protocol data units (PPDUs). Each PPDU is a composite frame that includes a PLCP preamble and header as well as one or more MAC protocol data units (MPDUs).

The APs and STAs in each WLAN may transmit PPDUs over an unlicensed spectrum, which may be a portion of the spectrum that includes frequency bands traditionally used by Wi-Fi technology, such as the 2.4 GHz band, the 5 GHz band, the 60 GHz band, the 3.6 GHz band, and the 900 MHz band. Some implementations of the APs and STAs described herein also may communicate in other frequency bands, such as the 6 GHz band, which may support both licensed and unlicensed communications. The APs and STAs also can be configured to communicate over other frequency bands such as shared licensed frequency bands, where multiple operators may have a license to operate in the same or overlapping frequency band or bands.

In the example of FIG. 1, the APs 110, 120, and 130 may be configured to use a same wireless channel. For example, the first BSS, the second BSS, and the third BSS may be referred to as overlapping BSSs (OBSSs) because they are configured for the same wireless channel in the same location. Traditionally, the APs may share the wireless channel using either a time-based division of the wireless channel or by obtaining access through a contention-based procedure. For example, channel access may use orthogonal frequency division multiplexing (OFDM). In newer WLAN communications technologies, orthogonal frequency division multiple access (OFDMA) may provide more efficient use of a wireless channel. OFDMA is further described in FIG. 2B. OFDMA refers to the ability to subdivide a wireless channel into resource units that can be assigned to different WLAN devices.

In a contention-based procedure, the WLAN devices (such as the APs 110, 120, and 130) may determine if the wireless channel is available and may win a contention for an upcoming transmission opportunity (TXOP) or multi-device transmission opportunity (mTXOP). Following a traditional contention-based procedure, the TXOP would be exclusively reserved for the WLAN device that wins the contention for channel access. For example, the first AP 110 may win the contention for the next TXOP. The first AP 110 may be referred to as a TXOP owner. In newer technologies, the APs may be configured to support mTXOPs on a wireless channel. An mTXOP refers to a multi-device transmission opportunity in which multiple WLAN devices may communicate during different sub-TXOPs of the mTXOP. In the examples of this disclosure, the sub-TXOPs represent time division multiplexed (TDM) segments of the mTXOP. However, in other implementations, the sub-TXOPs may represent frequency division multiplexed (FDM) resources, or a combination of TDM and FDM using OFDMA. The mTXOP owner (such as the first AP 110) may allocate a sub-TXOP to another AP (such as the second AP 120). During an mTXOP, the first WLAN and the second WLAN may sequentially (or concurrently, if using FDM) communicate using different sub-TXOPs of the mTXOP.

FIG. 2 shows conceptual diagrams of OFDM and OFDMA to illustrate resource assignments of a wireless channel. The top of FIG. 2 shows a conceptual diagram of OFDM 201. The OFDM channel width may include multiple subcarriers. A WLAN packet 230 (also referred to as a PPDU) includes data that is encoded using the subcarriers of the channel width. For example, a first STA may transmit a first PPDU 210 at a first time period. During a second time period, a second STA may transmit a second PPDU 220. The PPDUs 210 and 220 may be different lengths of time. Typically, the first STA and the second STA (and any other STAs in the BSS) will contend for access to the channel.

Once the STA wins the contention, the STA can use the channel for transmission of a PPDU. As shown in FIG. 2A, different shading of the PPDUs indicates that different STAs may utilize the wireless channels sequentially, one at a time. However, this communication structure may be inefficient if a STA does not have enough data to justify using the full channel width. IEEE 802.11ax introduced the use of ODFMA in a WLAN.

The bottom of FIG. 2 shows a conceptual diagram of OFDMA 202. ODFMA breaks down the channel width into a plurality of resource units (RUs). Each RU may include a different quantity of subcarriers. Using OFDMA, an AP may allocate different RUs for different STAs. For example, a PPDU 250 may include different RUs allocated for a first STA, a second STA, a third STA, and a fourth STA. One RU 240 is allocated for a STA to transmit uplink data in the PPDU 250, while other RUs are allocated for different STAs. The allocation of RUs may be used to schedule channel access. For example, a trigger message from an AP may indicate which RUs are allocated to particular STAs to use for uplink traffic in the PPDU that follows the trigger message.

In some implementations of this disclosure, a sub-TXOP may be further divided based on resource assignments using OFDMA for concurrent transmissions. For example, a mTXOP owner (such as a first AP) may provide a sub-TXOP and resource assignment for the sub-TXOP to a neighboring AP (such as a second AP). The neighboring AP may use the resource assignment to schedule RUs for OBSS STAs or may use the resource assignment for downlink transmissions. In some implementations, when using OFDMA, both the first AP and the second AP may be able to transmit or receive wireless communications during the sub-TXOP.

Figure 3:
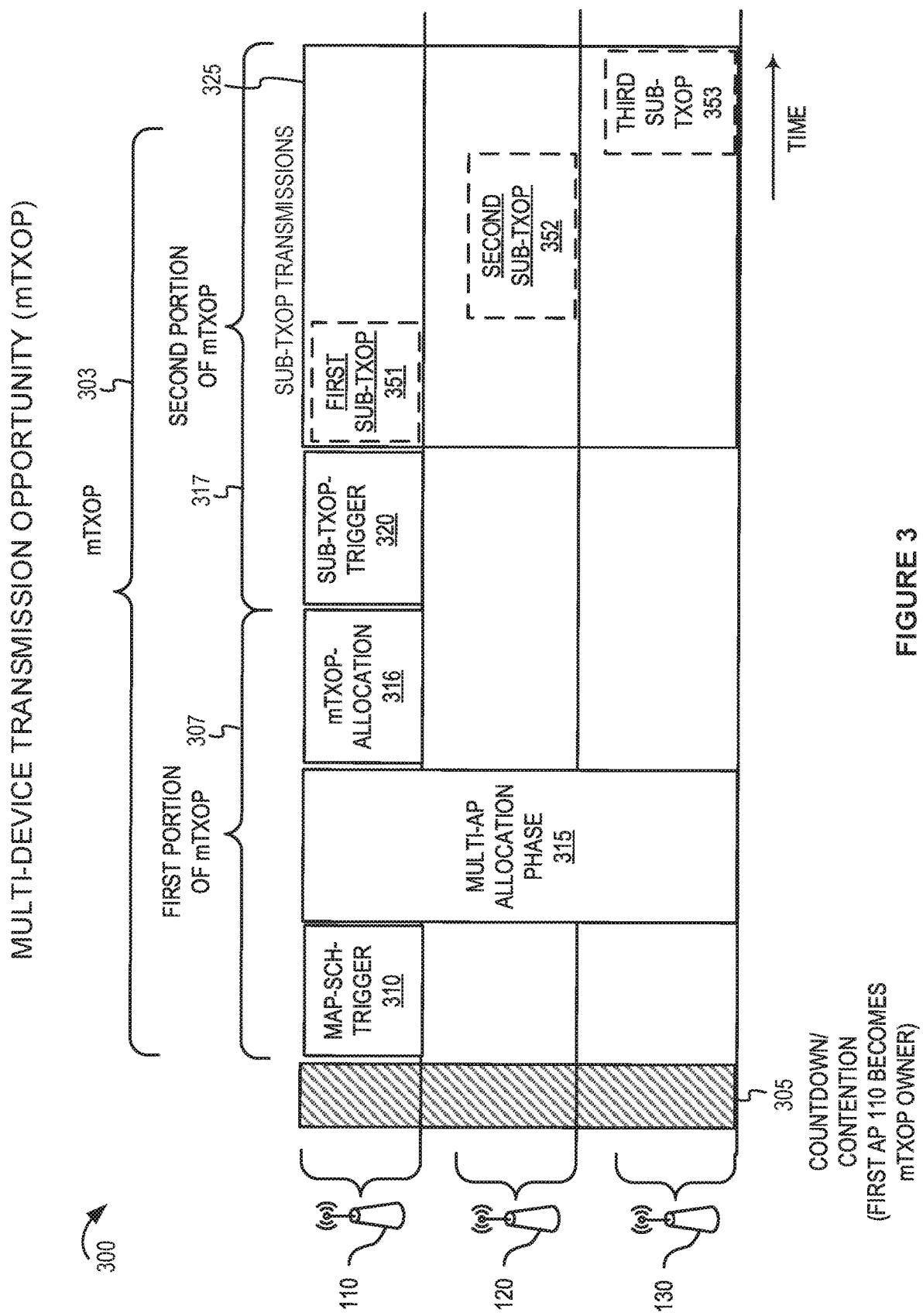
FIG. 3 illustrates an example of a multiple access point (multi-AP) coordination technique that supports sharing an mTXOP.

FIG. 3 illustrates an example of multi-AP coordination technique 300 that supports sharing an mTXOP 303. In this example, a first AP 110, a second AP 120, and a third AP 130 may participate in sub-TXOP transmissions 325 during a second portion 317 of the mTXOP 303. The example is based on a contention-based communication system. In some newer frequency bands (such as 6G), the wireless channel may be allocated by an mTXOP owner that is delegated, selected, or which has won a contention-based procedure. Initially, in the contention-based procedure (such as according to an EDCA contention-based channel access procedure), the APs 110, 120, and 130 may contend for ownership of the mTXOP 303 during a contention/count-down window 305. In this example, the first AP 110 may win ownership of the mTXOP 303. The first AP 110 may be referred to as the mTXOP owner. In other systems, there may be other ways for the first AP 110 to become the mTXOP owner for an upcoming mTXOP. Regardless of how the first AP 110 becomes the mTXOP owner for the wireless channel, the first AP 110 may be in control of allocating sub-TXOPs and resources during the mTXOP.

Upon winning the contention-based channel access procedure, the first AP 110 may initiate a multi-AP allocation phase during a first portion 307 of the mTXOP 303. The multi-AP allocation phase may be condensed or eliminated in some implementations. In the example of FIG. 3, the first AP 110 may transmit a multi-AP scheduling trigger (which may be referred to as a MAP-Sch-Trigger 310 message). The MAP-Sch-Trigger 310 may be received by each of the second AP 120 and the third AP 130. The MAP-Sch-Trigger 310 may be a MAP PPDU that the first AP 110 transmits to initiate the allocation phase. The second AP 120 and the third AP 130 may transmit one or more multi-AP scheduling communications during a multi-AP allocation phase 315.

The first AP 110, based on transmissions of the second AP 120 and the third AP 130, may determine resources (such as frequency resources, time/duration resources, or a combination thereof) that will be used for multi-AP communications in a second portion 317 of the mTXOP 303. The first AP 110 may then transmit an mTXOP-allocation message 316. The mTXOP-allocation message 316 may indicate timing or frequency resources (or both) for a plurality of sub-TXOPs 351, 352, and 353 (collectively referred to as sub-TXOP transmissions 325) during the second portion 317 of the mTXOP 303. In some implementations, a sub-TXOP trigger message 320 sent by the first AP 110 may indicate the beginning of the second portion 317 of the mTXOP 303. In some cases, the sub-TXOP transmission 325 may include transmissions from multiples BSSs simultaneously using OFDMA resources allocated in the mTXOP allocation 316. In the example of FIG. 3, the sub-TXOP transmissions 325 use a time-division of the sub-TXOP transmissions 325. For example, the sub-TXOP transmissions 325 may include a first sub-TXOP 351 for the first AP 110, a second sub-TXOP 352 for the second AP 120, and a third sub-TXOP 353 for the third AP 130. As shown in FIG. 3, the sub-TXOPs 351, 352, and 353 may have different durations.

In some implementations, the multi-AP allocation phase 315 includes at least one message from the second AP 120 or the third AP 130 (or both) to the first AP 110 to indicate scheduling information associated with the second AP 120 or the third AP 130. For example, the scheduling information may include a back-off counter, buffer status information, a resource request, a latency parameter, a preferred sub-TXOP duration, or any combination thereof. The first AP 110 may collect scheduling information from multiple neighboring APs and determine a fair distribution of the sub-TXOP transmissions 325 by comparing the scheduling information. FIGS. 4 and 5 provide examples of how the first AP 110 may obtain the scheduling information.

Following the mTXOP, the mTXOP owner may refrain from contending for the next mTXOP. Alternatively, the mTXOP owner may reset a back-off counter for the contention-based procedure, giving some other devices the opportunity to win the contention for the next mTXOP. Furthermore, if a neighboring AP communicates with its BSS during the sub-TXOP transmissions 325 of an mTXOP, that neighboring AP may reset its back-off counter. The example of resetting back-off counters may be one way of several alternatives which can be used to reduce the possibility that any single AP will monopolize many consecutive mTXOPs to the detriment of other APs.

FIG. 4 illustrates an example of a multi-device allocation phase in a first portion of the mTXOP. As with all the examples in this disclosure, the first AP 110 may be the TXOP owner for the upcoming TXOP. The first AP 110 may transmit a MAP-Sch-Trigger to each neighboring AP 120 and 130, one at a time, to initiate scheduling of multi-AP communications. The first AP 110 may send a first MAP-Sch-Trigger 410, which may be received by the second AP 120. The second AP 120, in this case, may transmit a scheduling information frame 415 that may be received by the first AP 110. The first AP 110 may then send a second MAP-Sch-Trigger 420, which may be received by the third AP 130. The third AP 130, in this case, may transmit a scheduling information frame 425 that may be received by the first AP 110. In some implementations, the scheduling information frames 415 and 425 may be sent from the second and third APs 120 and 130 to their respective STAs and the first AP may observe them to determine the scheduling information. Alternatively, the scheduling information frames 415 and 425 may be sent from the second and third APs 120 and 130 directly to the first AP 110. The first AP 110, based on the scheduling information frames 415 and 425, may determine sub-TXOP durations or resources for transmissions of each AP 110, 120, and 130, and may transmit an mTXOP allocation 316 to inform the APs (and STAs or even non-WLAN devices) regarding an allocation of sub-TXOPs in the sub-TXOP transmissions 325. A Sub-TXOP-Trigger 320 may indicate a beginning of the sub-TXOP transmissions 325.

In this example, because one neighboring AP is targeted at any time by the MAP-Sch-trigger 410 or 420, the scheduling indications 415 and 425 will not interfere with each other. In some cases, the scheduling indications 415 and 425 may include a scheduling frame transmission that is sent by each neighboring AP 120, and 130 to its associated STAs. The first AP 110, as the TXOP Owner, monitors SI frames and may determine when to poll the next-in-line AP. Such a technique provides relatively simple scheduling for multi-AP communications, although time resources associated with multiple APs are consumed.

FIG. 5 illustrates an example 500 of gathering scheduling information from multiple APs in a first portion of the mTXOP. In this example, first AP 110, second AP 120, and third AP 130 may perform mTXOP scheduling in which concurrent scheduling of multiple APs 110, 120, and 130 may be implemented. As described previously, the first AP 110 may be the mTXOP owner for the upcoming mTXOP. The first AP 110 may transmit a MAP-Sch-Trigger 310 to initiate scheduling of multi-AP communications. The second AP 120 and the third AP 130, in this case, may concurrently transmit a scheduling information frames using different OFDMA resources.

In some cases, the scheduling indication may be provided in a MAP-PPDU from each of the second AP 120 and third AP 130. The subchannel used by each AP 120 and 130 for transmission of a SI frame may be derived from the MAP-Sch-Trigger 310. In the example of FIG. 5, the second AP 120 may transmit a scheduling indication that includes a preamble 515-a, and a SI-frame 520 that occupies a first sub-channel of multiple available subchannels (such as a first 20 MHz channel of multiple available 20 MHz channels). In this example, two subchannels are illustrated, and the second AP 120 has an unused second subchannel 525. Similarly, the third AP 130 may transmit a scheduling indication that includes a preamble 515-b, and a SI-frame 530 that occupies the second subchannel, leaving the first subchannel as an unused subchannel 535. Thus, the different SI frames 520 and 530 will not interfere with each other and can be concurrently transmitted, which may more efficiently use time and frequency resources.

In some cases, the MAP-Sch-Trigger 310 may be transmitted by the first AP 110, as the mTXOP owner AP, to each of the other neighboring APs 120, and 130, and may trigger the other APs 120, and 130 to transmit the SI Frames 520 and 530, respectively. In some cases, the preambles 515-a and 515-b transmitted by each AP 120 and 130, respectively, may include an AP identifier (such as expressed using short BSSID or Color code, or special associated ID (AID)) and an indication of a subchannel of the SI frame. In some cases, the preamble 515 and SI frames 520 and 530 may be formatted in a MAP-PPDU. Associated STAs of the different APs may, in some cases, determine the subchannel used by its AP 110, 120, and 130 by decoding the preamble 515, and each STA in the associated BSS may tune to the subchannel assigned for their respective AP 120 or 130, and all per-STA information may be carried within the SI frame (such as MAC information). In some implementations, the SI frames may include scheduling information from each of the subordinate APs to assist the first AP 110 to determine the allocation of sub-TXOPs.

Figure 8:
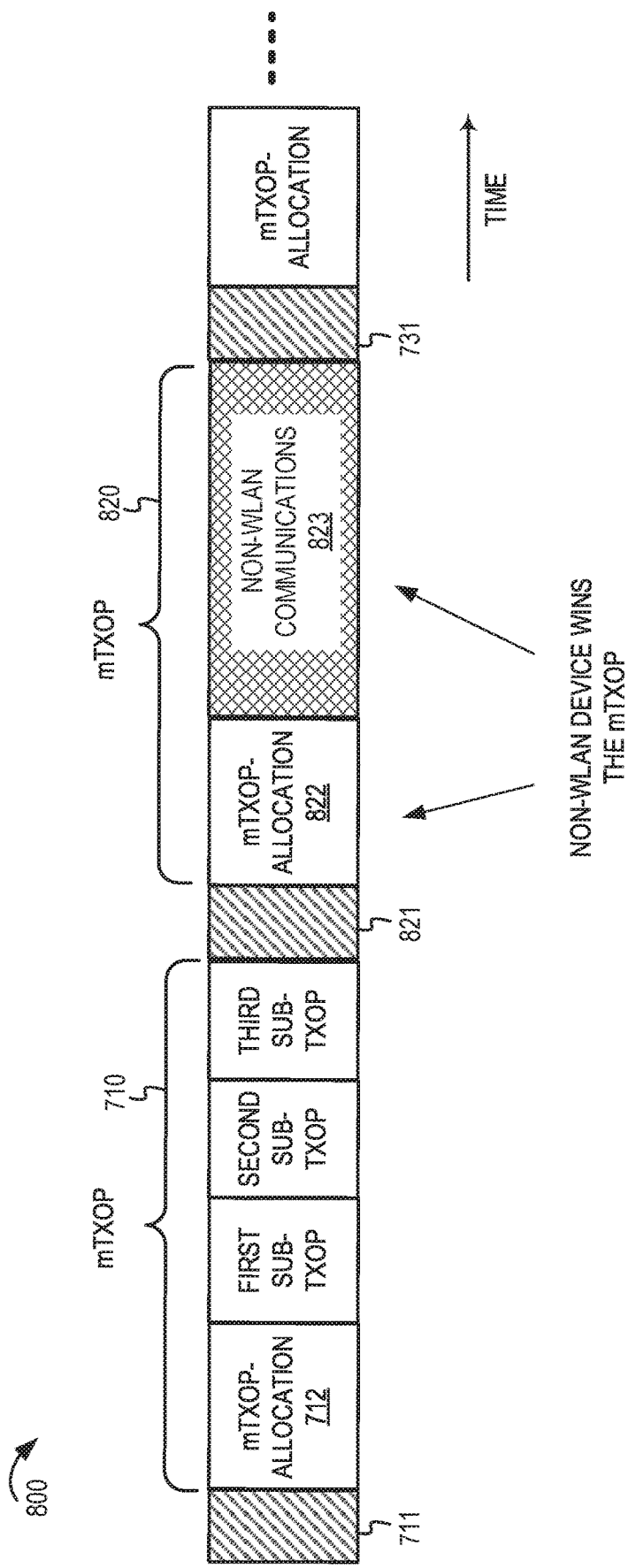
FIG. 8 illustrates mTXOPs which may be won by WLAN or non-WLAN devices according to some implementations.
Figure 9:
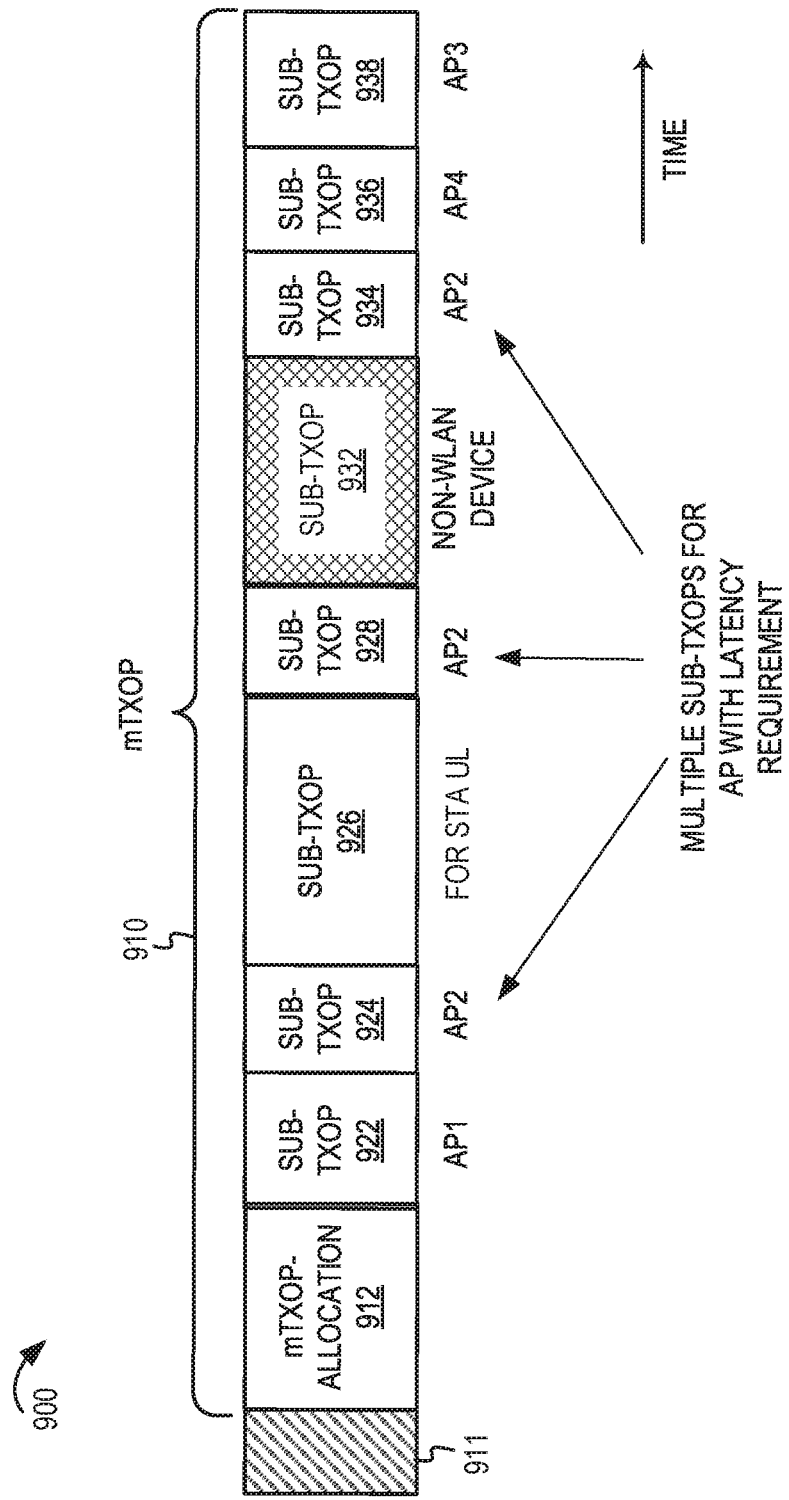
FIG. 9 illustrates several example variations of how sub-TXOPs may be allocated according to some implementations.

The first AP 110 may determine resources for transmissions of each AP 120 and 130, based on the SI frames 520 and 530. Following the multi-AP allocation phase, the first AP 110 may transmit an mTXOP allocation 316 to indicate the allocation of sub-TXOPs to occur during the sub-TXOP transmissions 325. A Sub-TXOP-Trigger 320 may indicate a beginning of the sub-TXOP transmissions 325. The sub-TXOP transmissions 325 may be organized using time division, frequency division, or a combination of time and frequency division. For example, as described in FIGS. 6A, 6B, and 6C, the mTXOP allocation 316 may indicate OFDM subchannels or resource units (RUs) for particular devices to use in during the sub-TXOP transmissions 325. FIGS. 8 and 9 describe several example of time division scheduling. In some implementations, a combination of time division and OFDM resource allocation can be used for each sub-TXOP, as described in FIG. 6B.

Figure 6A:
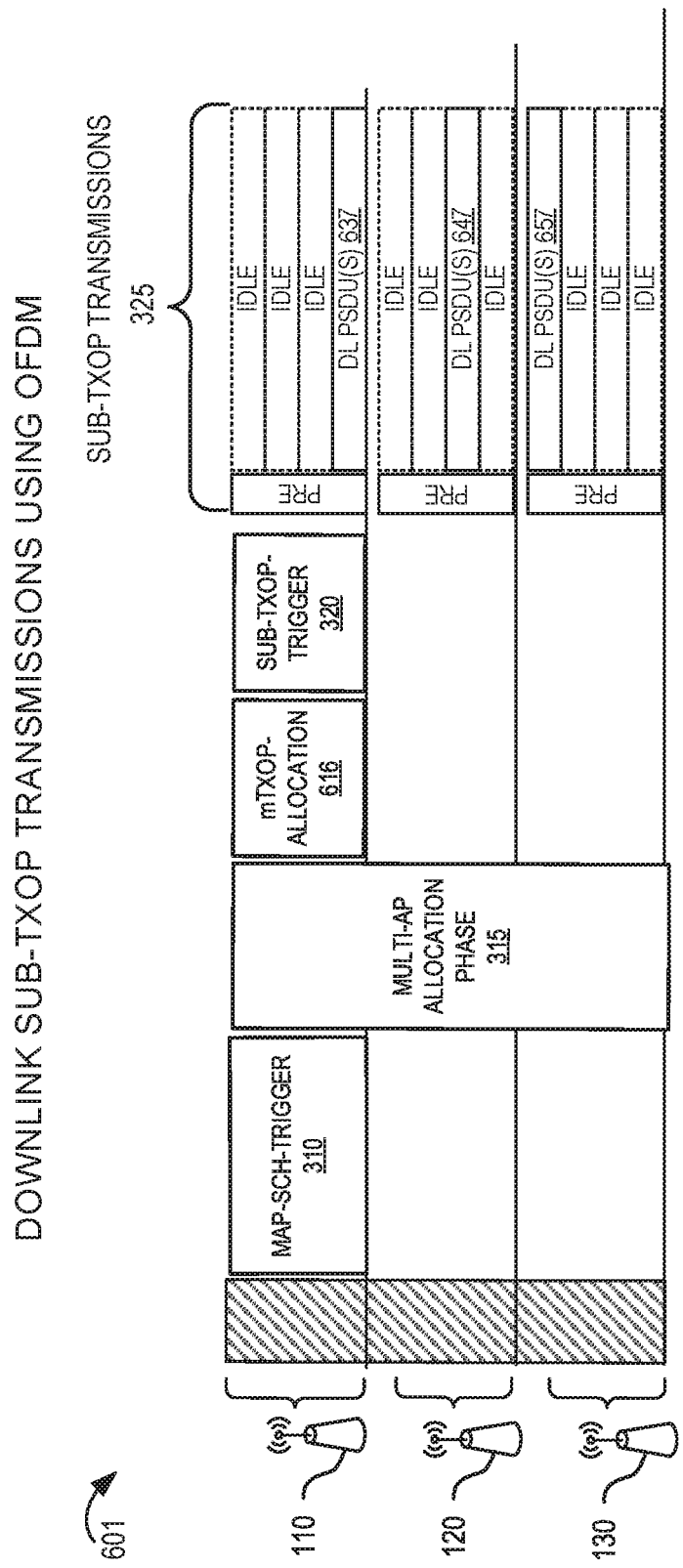
FIG. 6A illustrates an example of downlink concurrent allocations using OFDM in a second portion of the mTXOP.

FIG. 6A illustrates an example of downlink concurrent allocations using OFDM in a second portion of the mTXOP. The sequence 601 begins with a MAP-Sch-Trigger 310 and a Multi-AP allocation phase 315 as previously described. Because the first AP 110 is the mTXOP owner for this example, the first AP 110 may transmit a scheduling trigger such as a MAP-Sch-Trigger 310. The MAP-Sch-Trigger 310 may be received by the second AP 120 and the third AP 130. The MAP-Sch-Trigger 310 may initiate a Multi-AP allocation phase 315. Following the multi-AP allocation phase 315, the first AP 110 may determine an allocation of sub-TXOPs for the second portion of the mTXOP. The first AP 110 may transmit an mTXOP-allocation 616 that indicates subchannels or RUs for the first AP 110, the second AP 120, and the third AP 130 to use for downlink transmissions during the sub-TXOP transmissions 325 portion of the mTXOP. The example of FIG. 6A depicts concurrent sub-TXOPs for use by multiple APs using OFDM sub-channels. In this example, the first AP 110, as the mTXOP owner, may determine the sub-channel (or resource units, RUs) for each neighboring AP 120 and 130 and may provide that information in the mTXOP-allocation 616. For example, the mTXOP-allocation 616 may provide allocation information for coordinated OFDMA, which may include sub-channel assignment for each of the participating APs 110, 120, and 130 for use in transmitting downlink concurrent transmissions. In this example, the first AP 110 may transmit a preamble that spans several subchannels, and DL PSDU(s) 637 using a first subchannel (such as a primary 20 MHz channel), while remaining subchannels are idle. The second AP 120 may transmit a preamble that spans several sub-channels, and PSDU(s) 647 using a second subchannel (such as a secondary 20 MHz channel), while remaining subchannels are idle. Likewise, the third AP 130 may transmit a preamble that spans several subchannels, and PSDU(s) 657 using a third subchannel (such as a secondary 40 MHz channel), while remaining subchannels are idle.

Figure 6B:
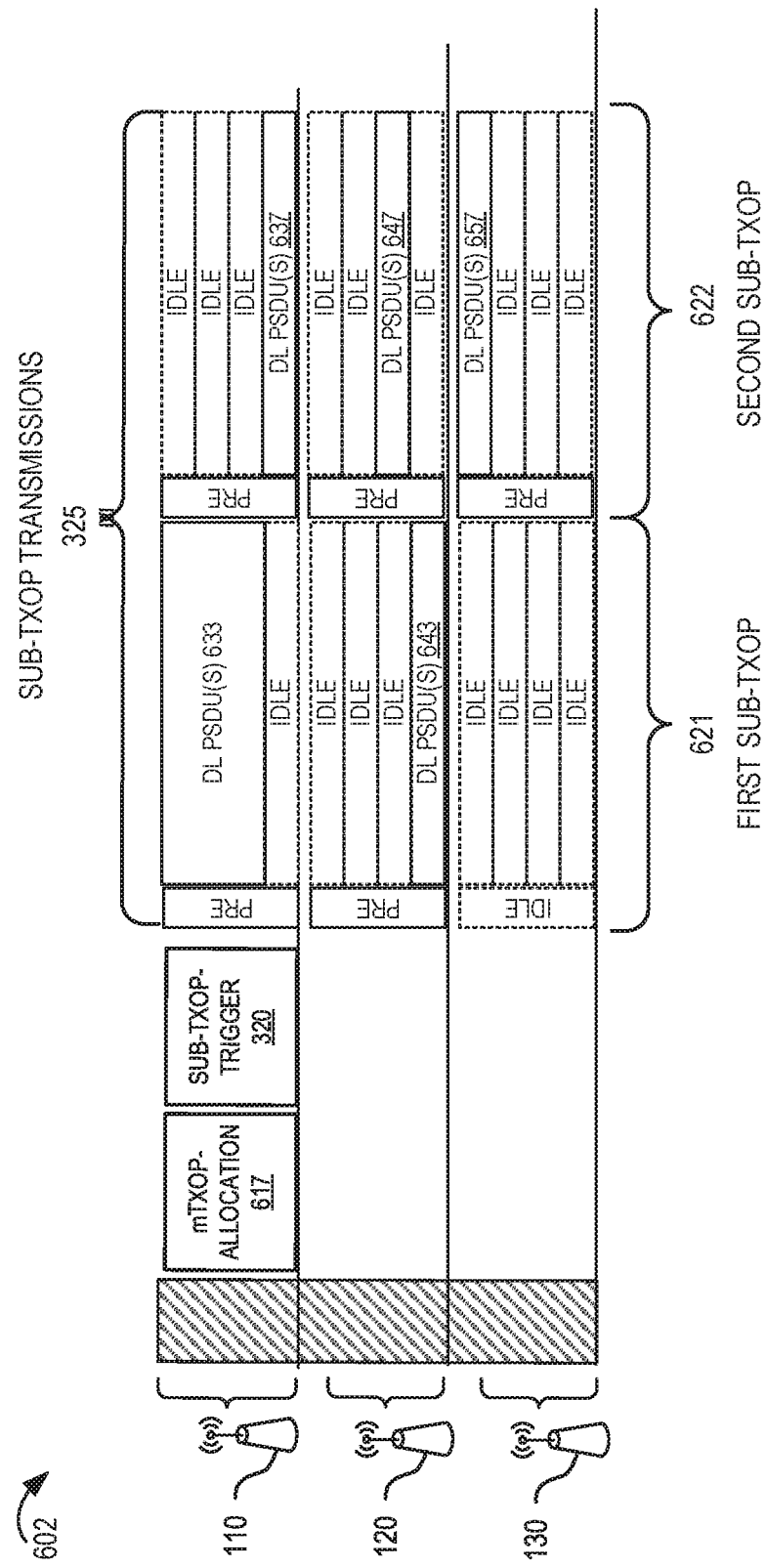
FIG. 6B illustrates another example with optimized downlink concurrent allocations using OFDM in a second portion of the mTXOP.

FIG. 6B illustrates another example with optimized downlink concurrent allocations using OFDM in a second portion of the mTXOP. In this example, similarly as with the example of FIG. 6A, the first AP 110, the second AP 120, and the third AP 130 may perform coordinated transmissions in which concurrent allocations of sub-TXOPs for use by multiple APs. The example of FIG. 6B depicts concurrent allocations of sub-TXOPs for use by multiple APs using a combination of TDM and OFDM sub-channels. Furthermore, in this example, the multi-AP allocation phase may be skipped in an optimized process. For example, the first AP 110 (as the mTXOP owner) may skip the multi-AP allocation phase if the first AP 110 has already obtained or determined scheduling information regarding the neighboring APs before the mTXOP. The first AP 110 may transmit an mTXOP-allocation 617 directly following contention, which may indicate the mapping of AP identifiers to corresponding subchannels and sub-TXOPs. For example, the mTXOP-allocation 617 may provide allocation information for coordinated OFDMA, which may include sub-channel assignment for each of the participating APs for use in transmitting coordinated OFDMA communications.

In the sequence 602, the first AP 110 (as the mTXOP owner for this example) may determine an allocation of sub-TXOPs within the second portion of the mTXOP. The first AP 110 may transmit an mTXOP-allocation 617 that indicates the sub-TXOPs and resource assignments for the second AP 120, and the third AP 130 to use for downlink transmissions during the sub-TXOP transmissions 325 portion of the mTXOP. A Sub-TXOP-Trigger 320 may signal the beginning of the second portion of the mTXOP. In some implementations, the Sub-TXOP-Trigger 320 may be eliminated. For example, the mTXOP-allocation 617 may include an indicator that signals that the sub-TXOP transmissions 325 will follow directly after the mTXOP-allocation 617.

In the example of FIG. 6B, the allocation includes sub-channel assignments for the first AP 110 and the second AP 120 to use a first sub-TXOP 621. The allocation also includes subchannel assignments for the first AP 110, the second AP 120, and the third AP 130 to use a second sub-TXOP 622. As shown, the subchannels assigned to each AP may be different for the different sub-TXOPs. In the example of FIG. 6B, following Sub-TXOP-Trigger 320 (and an interface space, such as a short interframe space (SIFS), the first AP 110 may initiate transmission of a MAP PPDUs, which may include a preamble and PSDU(s) 633. The allocation may provide multiple subchannels (as shown) for a bonded or larger bandwidth allocation. Similarly, the second AP 120 may transmit a preamble followed by corresponding PSDU(s) 643. The preambles and PSDU(s) 633, 643 may be transmitted from each AP 110, 120, simultaneously, and such transmissions may start following a SIFS after Sub-TXOP-Trigger 320. In this example, the first AP 110 and the second AP 120 may transmit preambles that span a number of subchannels. The PSDU(s) 633 may occupy three subchannel (such as a bonded 60 MHz channel made up of three 20 MHz subchannels), while remaining subchannels are idle. The second AP 120 may transmit preamble that spans a number of subchannels, and PSDU(s) 643 may occupy a fourth subchannel while the other subchannels are idle. The third AP 130 may not have any allocated resources during the first Sub-TXOP 621 and may remain idle.

Following the first Sub-TXOP 321, a second Sub-TXOP 622 may begin. In some implementations, the first Sub-TXOP 621 and the second Sub-TXOP 622 may have an equal or consistent duration as shown in FIG. 6B. In other implementations, the first Sub-TXOP 621 and the second Sub-TXOP 622 may have different durations according to the allocation indicated in the mTXOP-allocation 617. In the example of FIG. 6B, the allocation includes subchannel assignments for each of the first AP 110, the second AP 120, and the third AP 130. Each of the APs 110, 120, and 130 may concurrently signal a preamble that spans several subchannels. Following the preamble, the APs 110, 120, and 130 may transmit PSDU(s) 637, 647, 657 on their respectively assigned subchannels (as indicated in the mTXOP-allocation 617).

In some implementations, the STAs that are associated with the BSSs of the first AP 110, the second AP 120, and the third AP 130 may also observe the mTXOP-allocation 617 to determine if their respective BSS (or host AP) is allocated for any of the sub-TXOPs 621 or 622. Alternatively, or additionally, the STAs may observe the preambles at the beginning of the sub-TXOPs to determine which subchannels their respective BSS (or host AP) is using to signal downlink PSDU(s). For example, the preambles may include a per-AP part to indicate which subchannels or RUs are allocated for particular APs. The STAs may decode a common part of the preamble to determine the sub-channel (s) that are allocated for its host AP. Within the allocated sub-channel(s), another preamble may indicate RUs and STA identifiers to inform the STAs which RUs have downlink PSDU(s) for it to receive. If a STA is not part of the list, that STA may be allowed to go to doze state for the remainder of the sub-TXOP or mTXOP.

Figure 6C:
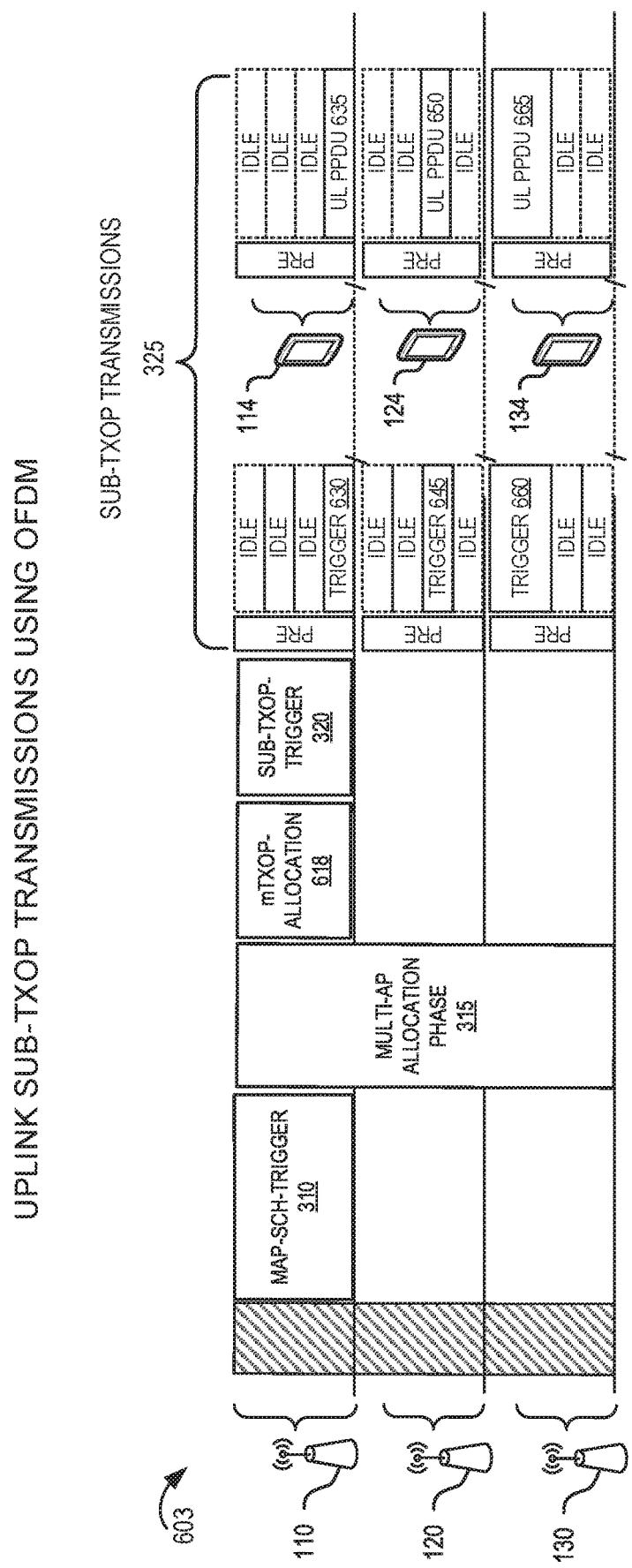
FIG. 6C illustrates an example of uplink concurrent allocations using OFDM in a second portion of the mTXOP.

FIG. 6C illustrates an example sequence 603 of uplink concurrent allocations using OFDM in a second portion of the mTXOP. In this example, first AP 110, second AP 120, and third AP 130 may perform uplink concurrent transmissions based on a schedule and resource assignments provided by the first AP 110. Because the first AP 110 is the mTXOP owner for this example, the first AP 110 may transmit a scheduling trigger such as a MAP-Sch-Trigger 310, which may be received by the second AP 120 and the third AP 120. The example of FIG. 6C depicts concurrent allocations for multiple APs using OFDM subchannels. In this example, the first AP 110, as the mTXOP owner, may determine the sub-channel (or resource units, RUs) for each neighboring AP 120 and 130 and may provide that information in the mTXOP-allocation 618. For example, the mTXOP-allocation 618 may provide allocation information for coordinated OFDMA, which may include sub-channel assignment for each of the participating APs 110, 120, and 130 for use in receiving uplink concurrent transmissions. The second AP 120 and the third AP 130, in this case, may perform multi-AP allocation 315 according to any one of the examples discussed herein.

Following the sub-TXOP-Trigger 320, the APs 110, 120, and 130 may trigger the uplink concurrent transmissions. In this example, multi-AP concurrent transmission may use OFDMA to provide concurrent transmissions of multiple APs 110, 120, and 130 and STAs, and uplink transmissions of the STAs may be triggered by a corresponding trigger (shown as triggers 630, 645, 660) from their respective AP. In this example, the first AP 110 may transmit preamble that spans several subchannels, and trigger 630 using a first subchannel (such as a primary 20 MHz channel), while remaining subchannels are idle. The trigger 630 may trigger the corresponding STA(s) (such as the first STA 114) to transmit an UL PPDU 635 in the first subchannel, while remaining subchannels are idle. The second AP 120 may transmit a preamble that spans several subchannels, and trigger 645 using a second subchannel (such as a secondary 20 MHz channel), while remaining subchannels are idle. The trigger 645 may trigger the corresponding STA(s) (such as the second STA 124) to transmit an UL PPDU 650 in the second subchannel, while remaining subchannels are idle. The third AP 130 may transmit a preamble that spans several subchannels, and a trigger 660 using a third subchannel (such as a secondary 40 MHz channel), while remaining subchannels are idle. The trigger 660 may trigger the corresponding STA(s) (such as the third STA 134) to transmit an UL PPDU 665 in all or a portion of the third subchannel, while remaining subchannels are idle. In some examples, the UL PPDUs on different subchannels may end at different times. In this example, the first AP 110, as the TXOP owner, may indicate the sub-channel for each neighboring AP 120 and 130. Following the trigger from the first AP 110, the first STA 114 may proceed with its UL concurrent transmission.

Figure 7:
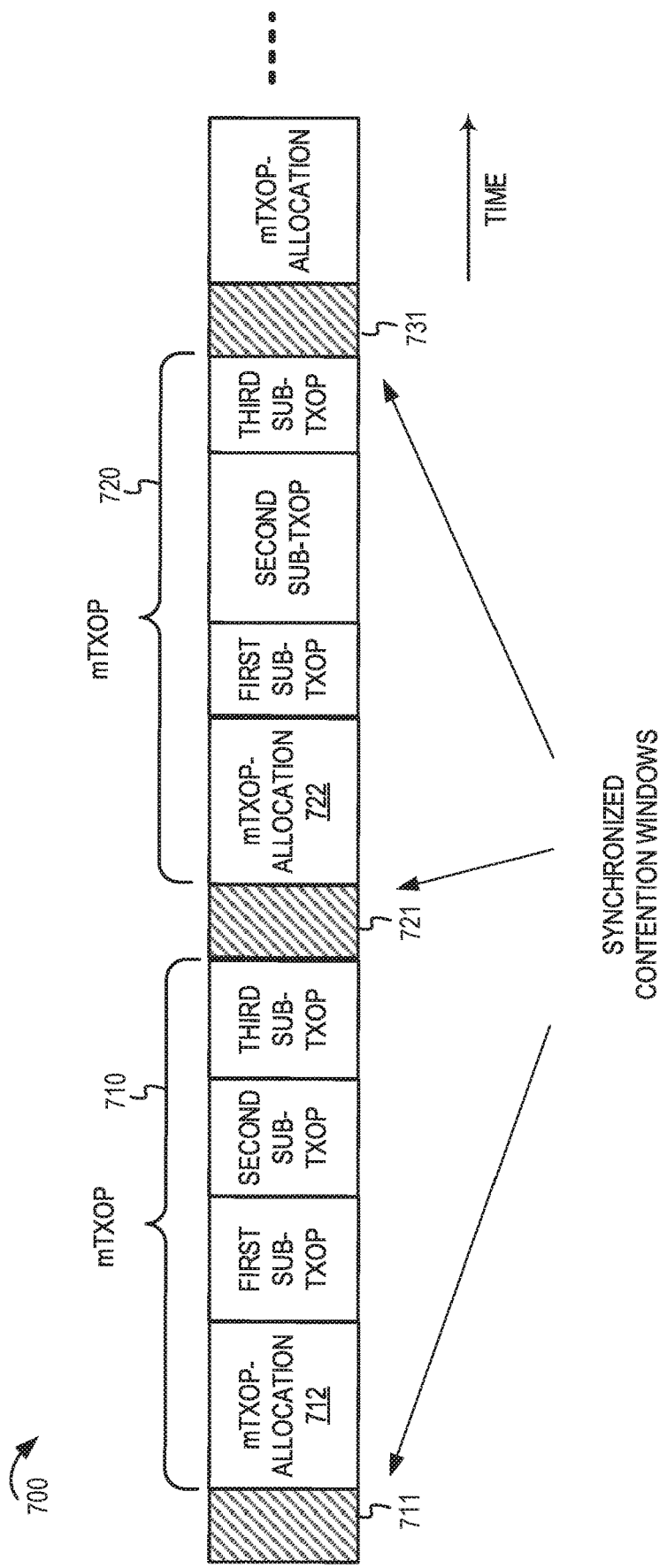
FIG. 7 illustrates synchronized contention windows according to some implementations.

FIG. 7 illustrates synchronized contention windows according to some implementations. A timing diagram 700 includes multiple synchronized contention windows 511, 721, and 731. Each contention window may precede a different mTXOP. For example, a first mTXOP 710 follows a first contention window 711, a second mTXOP 720 may follow a second contention window 721, and so on. The mTXOPs 710 and 720 may be owned by different APs (or even a non-WLAN device, as shown in FIG. 8). In a first portion of each mTXOP there may be an mTXOP allocation message (such as mTXOP-allocation 712 in the first mTXOP 710 and the mTXOP-allocation 322 in the second mTXOP 720). The MAP allocation phase (as described in FIG. 3-5) is omitted for brevity in the figure. Furthermore, in some implementations, the MAP allocation phase may be omitted from the mTXOP if the mTXOP owner already can prepare an allocation for the mTXOP without obtaining additional scheduling information from the neighbor APs. For example, the mTXOP owner may be an owner of a previous mTXOP and may allocate sub-TXOPs for the current mTXOP based scheduling information obtained in the previous mTXOP.

FIG. 7 shows how synchronized contention windows 711, 721, and 731 may be advantageous when multiple APs share a wireless channel using the techniques of this disclosure. For example, the APs (as well as their associated STAs or even non-WLAN devices) may observe the mTXOP-allocation messages that follow each contention window to determine an allocation of sub-TXOPs for the mTXOP. The timing of the contention windows are synchronized and deterministic by the various WLAN and non-WLAN devices in an area. For example, a protocol (such as neighbor aware networking, NAN) may be used for WLAN and non-WLAN devices to determine a synchronization schedule and timing of the contention windows. In another example, the various WLAN and non-WLAN devices may be synchronized based on a satellite signal (such as the Global Positioning System (GPS) clock signal). The timing for contention windows may be deterministic (such as a predefined or standardized timing) based on a time determined from the satellite signal. In another example, one AP may initiate the timing for contention windows and send a beacon or timestamp to cause neighboring APs (or non-WLAN devices) to synchronize to the timing. Alternatively, or additionally, a network controller may provide synchronization for neighboring APs. The network controller may be local to the neighboring APs in the neighborhood or may be a centralized resource.

FIG. 8 illustrates mTXOPs which may be won by WLAN or non-WLAN devices according to some implementations. A timing diagram 800 shows a first mTXOP 710 which is won by a WLAN device (such as the first AP 110) during a first contention window. Then, during a second contention window 821, a non-WLAN device may win a contention-based procedure to become the mTXOP owner of a second mTXOP 820. The non-WLAN device may send an mTXOP-allocation message 822 which may be received by the WLAN devices in the area and cause the WLAN devices to be aware that the second mTXOP 820 includes non-WLAN communications 823. The WLAN devices may enter a sleep state during the remainder of the second mTXOP 820.

In some implementations, non-WLAN devices may be capable of receiving the mTXOP allocation message from a WLAN device. For example, a non-WLAN device may receive and decode the mTXOP-allocation message 712 for the first mTXOP 310 (which was one by a WLAN device). The non-WLAN device may refrain from using the wireless channel during the first mTXOP 710 after determining that the WLAN device has become the owner of the first mTXOP 710.

FIG. 9 illustrates several example variations of how sub-TXOPs may be allocated according to some implementations. A timing diagram 900 shows an mTXOP 910, which has been expanded in FIG. 9 to show several examples how sub-TXOPs may be allocated. An mTXOP allocation 912 follows a contention window 911. In the example of FIG. 9, a WLAN device (such as the first AP 110) has won ownership of the mTXOP 910. The mTXOP allocation 912 includes allocations for multiple sub-TXOPs 922, 924, 926, 928, 932, 934, 936, and 938. A first sub-TXOP 922 may be allocated for a first AP (designated AP1 in this figure for brevity).

As described previously, some communications may have a latency sensitivity. For example, voice over IP (or video or multimedia over IP) may use short communications with low latency between communications. In FIG. 9, a second AP (AP2) may be communicating media content to a STA associated with the second AP. During a allocation phase of the mTXOP 910, the second AP may inform the mTXOP own regarding the latency considerations of the media stream. For example, a quality of service (QoS) indicator, timing requirement, or other parameter may be included in scheduling information (not shown) sent from the second AP to the mTXOP owner before the mTXOP owner determines the allocation for the mTXOP 910. The mTXOP owner may allocate multiple sub-TXOPs for the second AP. For example, the mTXOP allocation 912 may indicate that sub-TXOPs 924, 928, and 934 are allocated to the second AP.

In some implementations, each AP may use their allocated sub-TXOP for uplink or downlink traffic for the BSS managed by the AP. In another example, the mTXOP allocation 912 may include a sub-TXOP 926 for opportunistic uplink access by one or more STAs. For example, the sub-TXOP 926 may be available for any STAs that have uplink traffic to access the wireless channel to transmit uplink traffic. In some implementations, the mTXOP allocation 912 may indicate which STAs are permitted to use the sub-TXOP 926. For example, the mTXOP allocation 912 may indicate a partial address, BSSID, or other parameter to limit which STAs may use the sub-TXOP 926 for opportunistic uplink access.

In another example variation, the WLAN device which is the mTXOP owner may allocate a sub-TXOP 932 for use by a non-WLAN device. The non-WLAN device (just as the WLAN devices) may receive the mTXOP allocation 912 and determine the timing for the sub-TXOP 932 allocated to it. In some implementations, the mTXOP allocation 912 may specify a particular non-WLAN device using an identifier. Alternatively, the mTXOP allocation 912 may indicate that the sub-TXOP 932 is reserved for non-WLAN wireless communication without identifying a particular device.

As shown in FIG. 9, the mTXOP allocation 912 does not need to follow a particular order or sequence for the sub-TXOPs. For example, a sub-TXOP 934 for a fourth AP (AP4) may precede a sub-TXOP 936 for a third AP (AP3).

The ordering of APs, and durations of the sub-TXOPs allocated to them, may be based on a fairness algorithm intended to fairly distribute the mTXOP among multiple APs. For example, a buffer state, countdown timer, or latency consideration may impact how the mTXOP owner allocates the sub-TXOPs. In some implementations, subordinate APs may inform the mTXOP owner regarding a desired or preferred duration of a sub-TXOP. The mTXOP may (but may not be required to) take the request into consideration when allocating the sub-TXOPs.

The fairness algorithm is just one example of how an mTXOP owner can allocate sub-TXOPs to other APs or non-WLAN devices. Additionally, or alternatively, an mTXOP owner may allocate the sub-TXOPs based on a prioritization of neighboring APs. For example, the mTXOP owner assign priorities to a neighboring APs based on a comparison of their back-off counters, latency considerations, buffer utilization, ESS membership, or the like. For example, a neighboring AP with a lower back-off counter may get a higher priority than another neighboring AP having a higher back-off counter. The mTXOP owner may allocate time or resources in the mTXOP based on the priorities. In some implementations, the fairness algorithm may take into account a history of mTXOPs shared by the other WLAN devices.

FIG. 10A illustrates an example of a multi-device physical protocol data unit (MAP PPDU) 1000. In this example, the MAP PPDU 1000 may reuse a format of the defined HE MU PPDU, which may include a L-STF field 1004, a L-LTF field 1008, a L-SIG field 1012, a RL-SIG field 1016, a HE-SIG-A field 1020, a HE-SIG-B field 1024, HE-STF field 1028, one or more HE-LTF fields 1032 through 1036, a data portion 1040, and packet extension (PE) field 1044. In this example, the MAP PPDU 1000 may use the STAID fields of HE-SIG-B field 1024 to carry an identifier of each neighboring AP (such as determined from a short BSSID, a color-code, or a special AID value of the APs).

In some case, STA-ID field of HE-SIG B 1024 may carry the AID of a STA. In some cases, for coordinated re-use, the STA-ID may be overloaded to carry a BSS identifier of the AP, such that STAs associated with that BSS decode the corresponding resource unit. In some cases, one or more fields in the HE-SIG-A 1020 may indicate if HE-SIG-B field 1024 has an alternate interpretation. For example, by setting the BSS Color field in SIG-A to a special value (such as color=63). In other examples, UL Flag in SIG-A may be used (which in legacy system may be set to 1 when STA UL to AP, set to 0 when AP DL to STA, and in both cases the STA-ID may be set to the AID of intended STA, thus a transmitting AP will not set UL to 1), and for the purpose coordinated re-use, APs may set UL to 1 in the MU PPDU to indicates that STA-ID carries BSS identifiers. The BSS identifier may be set to, for example, a random AID value picked by each AP and advertised in the AP's beacon to inform associated STAs, derived based on the BSSID of the AP (such as STAs derive by applying a hash function to the BSSID), or a BSS color indication.

FIG. 10B illustrates another example of a multi-device physical protocol data unit 1050. In this example, the MAP PPDU 1050 may modify a format of the defined HE TB PPDU, which may include a L-STF field 1054, a L-LTF field 1058, a L-SIG field 1062, a RL-SIG field 1066, a HE-SIG-A field 1070, a HE-STF field 1074, one or more HE-LTF fields 1078 through 1082, a data portion 1086, and packet extension (PE) field 1090. In this example, the MAP PPDU 1050 may have a new field defined (such as HE-SIG-C) to the preamble to carry the mapping of AP identifier to the subchannel. In other examples, the MAP PPDU 1050 may reuse the HE TB PPDU by reusing certain reserved/unused fields. For example, Spatial Reuse fields of the HE-SIG-A may be used for carrying the AP identifier and subchannel mapping. In further examples, a new EHT PPDU format may be defined to that provides information as discussed for MAP PPDUs. For example, SR bits in the HE-SIG-A field 1070 may be used to indicate that the MAP PPDU is associated with mTXOP allocation. In some cases, to ensure that HE-SIG-A and HE-SIG-B fields sent by all APs are the same, the mTXOP Owner AP may sends the contents of the HE SIG-A, HE-SIG-BA to the neighboring APs implicitly or explicitly and may set the BSS color in HE-SIG-A to a single value (color 0, for example).

Figure 11:
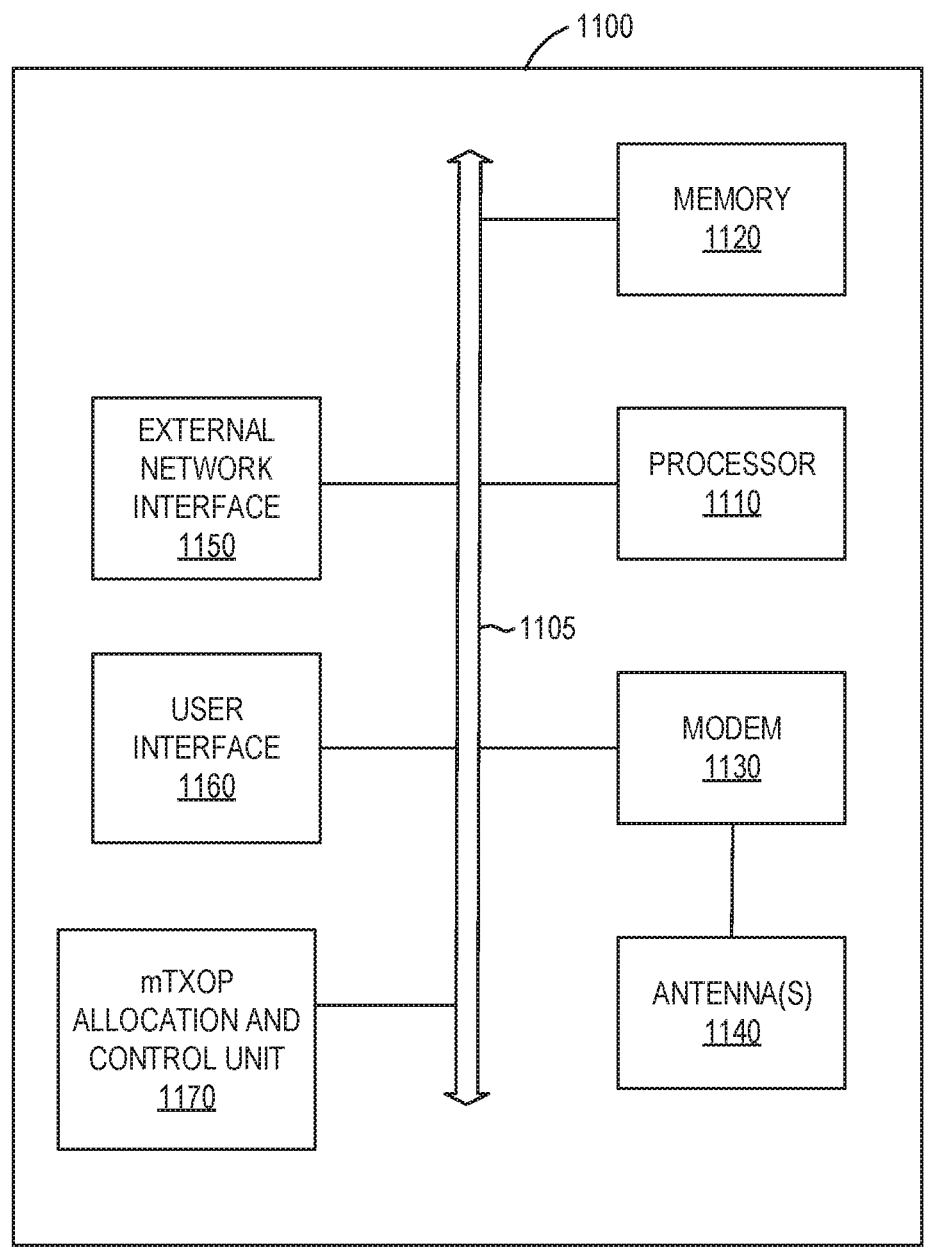
FIG. 11 shows a block diagram of an example AP according to some implementations.

FIG. 11 shows a block diagram of an example AP 1100 according to some implementations. For example, the AP 1100 may be an example of aspects of the first AP 110, the second AP 120, or the third AP 130 described with reference to other Figures of this disclosure. The AP 1100 is capable of transmitting and receiving wireless communications (for example, in the form of wireless packets), as well as of encoding and decoding such communications. For example, the wireless communications can include Wi-Fi packets including frames conforming to an IEEE 802.11 standard (such as that defined by the IEEE 802.11-2016 specification or amendments thereof including, but not limited to, 802.11ah, 802.11ay, 802.11ax, 802.11az, and 802.11ba). The AP 1100 includes at least one processor 1110 (collectively "the processor 1110"), at least one memory 1120 (collectively "the memory 1120"), at least one modem 1130 (collectively "the modem 1130"), at least one antenna 1140 (collectively "the antenna 1140"), at least one external network interface 1150 (collectively "the network interface 1150") and, in some instances, a user interface (UI) 1160. Each of the components (or "modules") described with reference to FIG. 11 can communicate with other ones of the components, directly or indirectly, over at least one bus 1105. Although illustrated as being coupled to the bus 1105, the memory 1120 may be coupled to the processor 1110.

The processor 1110 can include an intelligent hardware device such as, for example, a central processing unit (CPU), a microcontroller, an application-specific integrated circuit (ASIC), or a programmable logic device (PLD) such as a field programmable gate array (FPGA), among other possibilities. The processor 1110 processes information received through the modem 1130 and the external network interface 1130. The processor 1110 also can process information to be sent to the modem 1130 for transmission through the antenna 1140 and information to be sent to the external network interface 1130. The processor 1110 can generally be configured to perform various operations related to generating and transmitting a downlink frame and receiving an uplink frame.

The memory 1120 can include random access memory (RAM) and read-only memory (ROM). The memory 1120 also can store processor- or computer-executable software (SW) code containing instructions that, when executed by the processor 1110, cause the processor to perform various functions described herein for wireless communication, including generation and transmission of a downlink frame and reception of an uplink frame.

The modem 1130 is generally configured to modulate packets and to provide the modulated packets to the antenna 1140 for transmission, as well as to demodulate packets received from the antenna 1140 to provide demodulated packets. The modem 1130 generally includes or is coupled with at least one radio frequency (RF) transmitter and at least one RF receiver, which may be combined into one or more transceivers, and which are in turn coupled to one or more antennas 1140. For example, in some AP implementations, the AP 1100 can include multiple transmit antennas (each with a corresponding transmit chain) and multiple receive antennas (each with a corresponding receive chain). The modem 1130 can communicate bi-directionally, via the antenna 1140, with at least one wireless device (such as the first STA 114 described with reference to FIG. 1).

The modem 1130 may include digital processing circuitry, automatic gain control (AGC), a demodulator, a decoder and a demultiplexer. The digital signals received from the transceivers are provided to digital signal processing circuitry configured to acquire a received signal, for example, by detecting the presence of the signal and estimating the initial timing and frequency offsets. The digital signal processing circuitry is further configured to digitally condition the digital signals, for example, using channel (narrowband) filtering, analog impairment conditioning, such as correcting for I/Q imbalance, and applying digital gain to ultimately obtain a narrowband signal. The output of the digital signal processing circuitry is fed to the AGC, which is configured to use information extracted from the digital signals, for example, in one or more received training fields, to determine an appropriate gain. The output of the digital signal processing circuitry also is coupled with the demodulator, which is configured to extract modulated symbols from the signal and to reverse map the symbols to points in a modulation constellation to provide demodulated bits. The demodulator is coupled with the decoder, which is configured to decode the demodulated bits to provide decoded bits, which are then fed to the demultiplexer for demultiplexing. The demultiplexed bits may then be provided to the processor 1110 for processing, evaluation or interpretation, for example, by one or more host applications executing on the processor.

The AP 1100 may communicate with a core or backhaul network through the external network interface 1150 to gain access to external networks including the Internet. For example, the external network interface 1150 may include one or both of a wired (for example, Ethernet) network interface or wireless (for example, LTE, 4G, or 5G) network interface.

The AP 1100 may include an mTXOP allocation and control unit 1170. The mTXOP allocation and control unit 1170 may implement any of the mTXOP techniques described in this disclosure. For example, the mTXOP allocation and control unit 1170 in the first AP 110 may be configured to obtain scheduling information from a neighboring AP. The mTXOP allocation and control unit 1170 may determine and transmit an allocation for the mTXOP. The mTXOP allocation and control unit 1170 in the neighboring AP (such as the second AP 120) may utilize the mTXOP allocation to determine whether the allocation includes a sub-TXOP allocation for its use in accordance with implementations of this disclosure. In some implementations, the mTXOP allocation and control unit 1170 may be distributed within the processor 1110, the memory 1120, and the bus 1105. The memory 1120 can include computer instructions executable by the processor 1110 to implement the functionality of the mTXOP allocation and control unit 1170. Any of these functionalities may be partially (or entirely) implemented in hardware or on the processor 1110.

Figure 12:
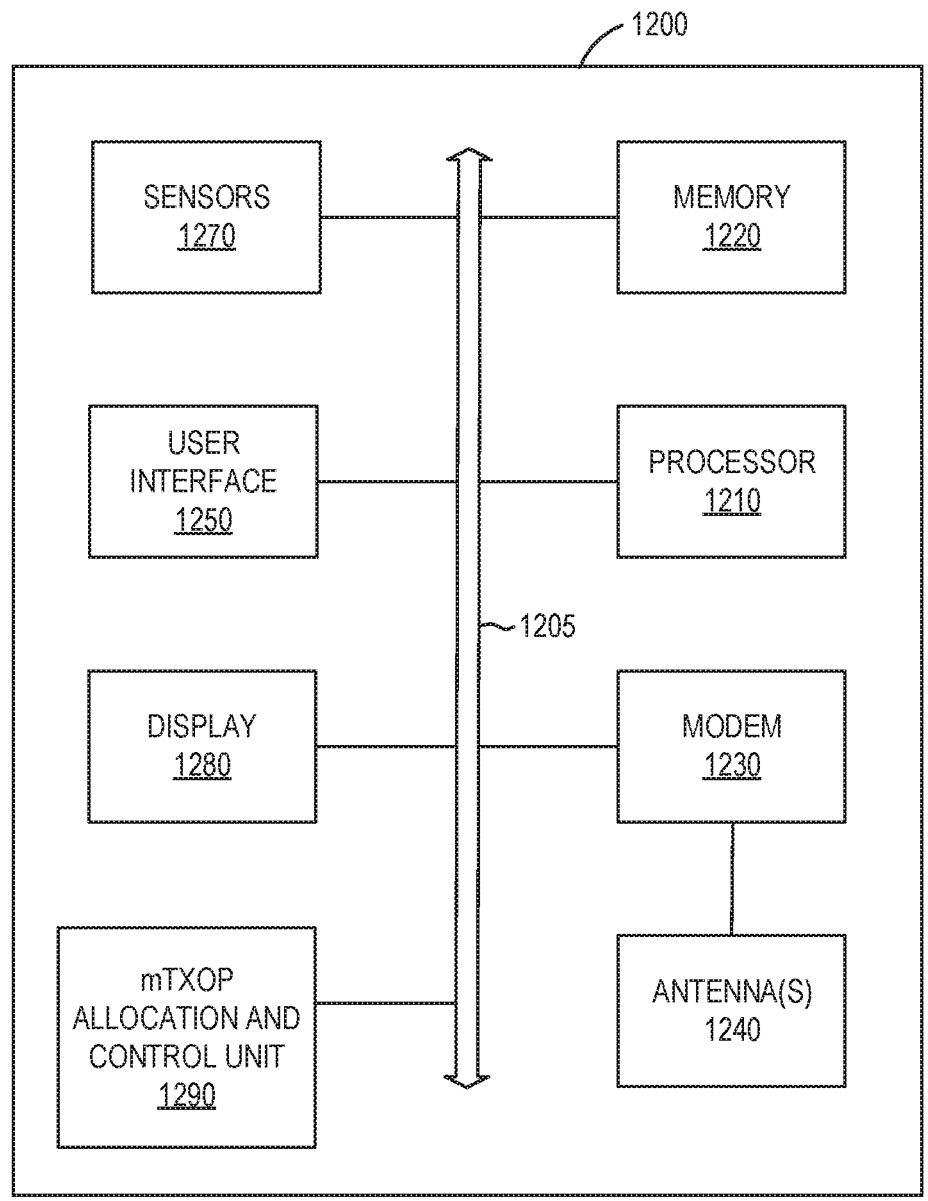
FIG. 12 shows a block diagram of an example STA according to some implementations.

FIG. 12 shows a block diagram of an example STA 1200 according to some implementations. For example, the wireless device 1200 may be an example of aspects of the first STA 114 or the second STA 124 described with reference to other Figures in this disclosure. The wireless device 1200 may be capable of transmitting and receiving wireless communications, as well as of encoding and decoding such communications. The wireless communications may conform to any of a number of different wireless communication protocols. For example, the wireless device 1200 may be capable of transmitting and receiving Wi-Fi packets including frames conforming to an IEEE 802.11 standard, such as defined by the IEEE 802.11-2016 specification or amendments thereof including, but not limited to, 802.11ah, 802.11ay, 802.11ax, 802.11az, and 802.11ba). Additionally, or alternatively, the wireless device 1200 may be capable of transmitting and receiving Bluetooth packets conforming to a Bluetooth standard, such as defined in IEEE 802.112 or by the Bluetooth SIG. Additionally, or alternatively, the wireless device 1200 may be capable of transmitting and receiving wireless packets associated with the Long-Term Evolution (LTE), International Mobile Telecommunications-Advanced (IMT-Advanced) 4G or 5G standards.

The wireless device 1200 includes at least one processor 1210 (collectively "the processor 1210"), at least one memory 1220 (collectively "the memory 1220"), at least one modem 1230 (collectively "the modem 1230") and at least one antenna 1240 (collectively "the antenna 1240"). In some implementations, the wireless device 1200 additionally includes some or all of the following: a user interface (UI) 1250 (such as a touchscreen or keypad), one or more sensors 1270 (such as one or more inertial sensors, accelerometers, temperature sensors, pressure sensors, or altitude sensors), and a display 1280. Each of the components (or "modules") described with reference to FIG. 12 can communicate with one another, directly or indirectly, over at least one bus 1205. Although illustrated as being coupled to the bus 1205, the memory 1220 may be coupled to the processor 1210.

The processor 1210 includes an intelligent hardware device such as, for example, a CPU, a microcontroller, an ASIC or a PLD such as an FPGA, among other possibilities. The processor 1210 processes information received through the modem 1230 as well as information to be sent to the modem 1230 for transmission through the antenna 1240. The processor 1210 can be configured to perform various operations related to receiving a downlink frame and generating and transmitting an uplink frame.

The memory 1220 can include RAM and ROM. The memory 1220 also can store processor- or computer-executable SW code containing instructions that, when executed, cause the processor 1210 to perform various functions described herein for wireless communication, including reception of a downlink frame and generation and transmission of an uplink frame.

The modem 1230 is generally configured to modulate packets and provide the modulated packets to the antenna 1240 for transmission, as well as to demodulate packets received from the antenna 1240 to provide demodulated packets. The modem 1230 generally includes at least one radio frequency (RF) transmitter and at least one RF receiver, which may be combined into one or more transceivers, and which are in turn coupled to one or more antennas 1240. For example, in some implementations, the wireless device 1200 can include multiple transmit antennas (each with a corresponding transmit chain) and multiple receive antennas (each with a corresponding receive chain). The modem 1230 can communicate bi-directionally, via the antenna 1240, with at least one AP (such as the first AP 110 or the second AP 120. As is described above, in some implementations, the modem also can communicate bi-directionally, via the antenna 1240, with other STAs directly without the use of an intermediary AP.

The modem 1230 may include digital processing circuitry, automatic gain control (AGC), a demodulator, a decoder and a demultiplexer. The digital signals received from the transceivers are provided to digital signal processing circuitry configured to acquire a received signal, for example, by detecting the presence of the signal and estimating the initial timing and frequency offsets. The digital signal processing circuitry is further configured to digitally condition the digital signals, for example, using channel (narrowband) filtering, analog impairment conditioning, such as correcting for I/Q imbalance, and applying digital gain to ultimately obtain a narrowband signal. The output of the digital signal processing circuitry is fed to the AGC, which is configured to use information extracted from the digital signals, for example, in one or more received training fields, to determine an appropriate gain. The output of the digital signal processing circuitry also is coupled with the demodulator, which is configured to extract modulated symbols from the signal and to reverse map the symbols to points in a modulation constellation to provide demodulated bits. The demodulator is coupled with the decoder, which is configured to decode the demodulated bits to provide decoded bits, which are then fed to the demultiplexer for demultiplexing. The demultiplexed bits may then be provided to the processor 1210 for processing, evaluation or interpretation, for example, by one or more host applications executing on the processor.

The wireless device 1200 may include an mTXOP allocation and control unit 1290. The mTXOP allocation and control unit 1290 may implement any of the mTXOP techniques described in this disclosure. For example, the mTXOP allocation and control unit 1290 may be configured to receive and process an mTXOP allocation message to determine whether any of the sub-TXOPs are for an AP with which the STA is associated. In some implementations, the mTXOP allocation and control unit 1290 may be distributed within the processor 1210, the memory 1220, and the bus 1205. The memory 1220 can include computer instructions executable by the processor 1210 to implement the functionality of the mTXOP allocation and control unit 1290. Any of these functionalities may be partially (or entirely) implemented in hardware or on the processor 1210.

Figure 13:
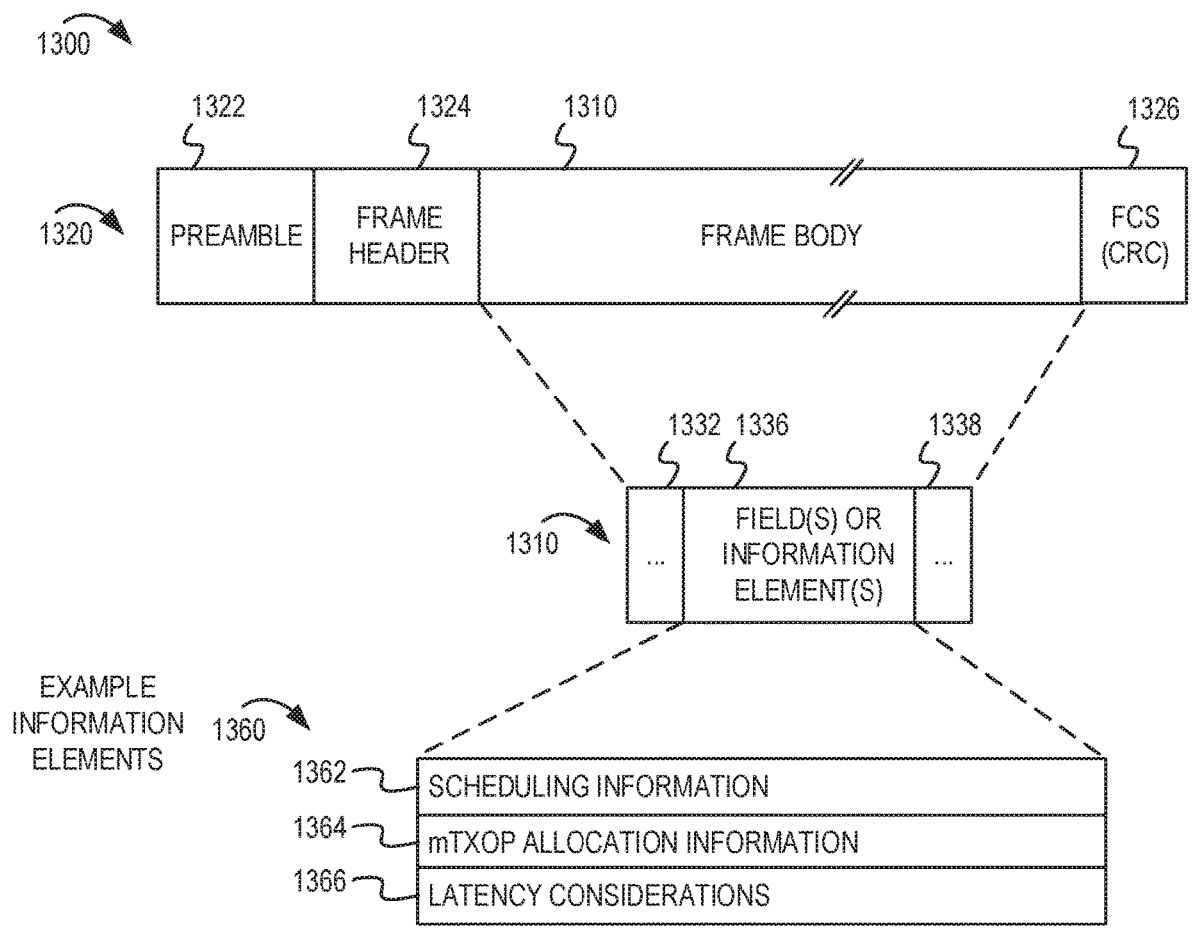
FIG. 13 shows a conceptual diagram of an example message format for communicating one or more parameters for mTXOP sharing.

FIG. 13 shows a conceptual diagram of an example message format for communicating one or more parameters for mTXOP sharing. For example, the message may be sent from the first AP 110 to a second AP 120 or from the second AP 120 to one of its STAs. This message format 1300 may be used to communicate parameters that define conditions or stipulations (also referred to as preconditions) for the OBSS to utilize a sub-TXOP assignment in a second portion of an mTXOP. FIG. 13 includes an example data frame 1320. The data frame 1320 may include a preamble 1322, a frame header 1324, a frame body 1310, and a frame check sequence (FCS) 1326. If included, the preamble 1322 may include one or more bits to establish synchronization. The preamble 1322 may be omitted in some WLANs where synchronization can be established by regular communications. The frame header 1324 may include source and destination network addresses (such as the network address of the sending AP and receiving AP, respectively), the length of data frame, or other frame control information. The frame body 1310 may be organized with a message format and may include a variety of fields or information elements 1332, 1336 and 1338.

Example information elements 1360 are shown in FIG. 13. The example information elements 1360 may include scheduling information 1362 from a subordinate AP to an mTXOP owner. For example, the scheduling information may include parameters to assist the mTXOP owner to fairly distribute the sub-TXOPs among multiple APs. Another example information element may include an mTXOP allocation 1364, which may be sent by an mTXOP owner. The mTXOP allocation 1364 may indicate a duration and/or timing of one or more sub-TXOPs. The sub-TXOPs may be assigned to particular WLAN or non-WLAN devices. Another example information element may include latency considerations 1366 from a subordinate AP to an mTXOP owner. The latency considerations 1366 may indicate a periodic timing, QoS parameter, or the like, associated with a media stream the subordinate AP has with one if its associated STAs.

Various implementations of this disclosure generally relate to allocating sub-TXOP for different WLAN devices during a multi-AP transmission opportunity (mTXOP) of a wireless channel. In some aspects of the disclosure, a scheme for multi-AP scheduling is provided, in which a first AP may gain channel access and become an owner of a mTXOP. For example, the first AP may win a contention-based procedure to become the owner of the mTXOP. Contention-based procedures may be performed during contention windows that are synchronized among neighboring devices. For brevity in this disclosure, the examples consistently use the first AP as the owner of a first mTXOP and the second AP as a neighboring AP. In other examples (such as a different mTXOP), the second AP may be the mTXOP owner. As the mTXOP owner, the first AP may coordinate with a second AP to allow both the first AP and the second AP to share the wireless channel during the first mTXOP. The first mTXOP may be divided into a plurality of subordinate transmission opportunities (sub-TXOPs) that are allocated by the owner of the first mTXOP. An allocation of the sub-TXOPs may be communicated during a first portion of the first mTXOP. In the examples of this disclosure, the sub-TXOPs may represent a time-division multiplexing schedule for a second portion of the first mTXOP. In other examples, the sub-TXOPs may represent frequency division (based on concurrent use of different sub-channel resources) of a wireless channel.

Particular implementations of the subject matter described in this disclosure can be implemented to realize one or more of the following potential advantages. A first AP (as mTXOP owner) of a first WLAN may allocate sub-TXOPs to fairly share a second portion of the mTXOP with neighboring devices. Neighboring devices can share parameters which enable the mTXOP owner to determine a fair schedule for the mTXOP to be shared by multiple devices. Synchronization of contention windows and mTXOPs may facilitate STAs, neighboring APs, and non-WLAN devices to determine the allocation for each mTXOP. Power saving may be realized by devices entering a sleep state during sub-TXOPs that are not relevant to them.

Figure 14:
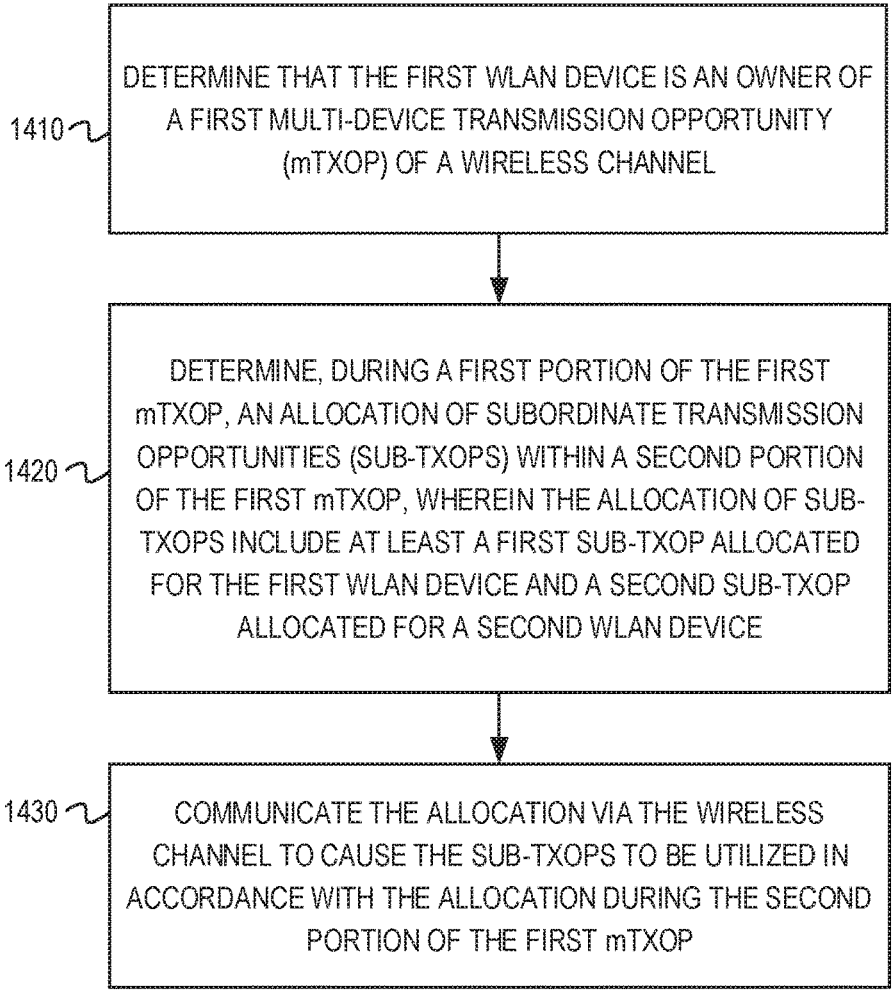
FIG. 14 shows a flowchart illustrating an example process for mTXOP sharing performed by a first WLAN device.

FIG. 14 shows a flowchart illustrating an example process for mTXOP sharing performed by a first WLAN device. In some implementations, the process 1600 may be performed by an mTXOP owner, such as the first AP 110 in the examples of this disclosure. In some implementations, the process 1400 begins in block 1410 with the first WLAN device determining that the first AP is an owner of a first multi-device transmission opportunity (mTXOP) of a wireless channel.

In block 1420, the process 1400 proceeds with determining, during a first portion of the first mTXOP, an allocation of subordinate transmission opportunities (sub-TXOPs) within a second portion of the first mTXOP. The allocation of sub-TXOPs may include at least a first sub-TXOP allocated for the first WLAN device and a second sub-TXOP allocated for a second WLAN device.

In block 1430, the process 1400 proceeds with communicating the allocation via the wireless channel to cause the sub-TXOPs to be utilized in accordance with the allocation during the second portion of the first mTXOP.

In some implementations, the first WLAN device may communicate with at least one station associated with the first AP during the first sub-TXOP of the plurality of sub-TXOP. The first WLAN device may permit the second WLAN device to communicate with at least a second station associated with the second WLAN device during the second sub-TXOP of the plurality of sub-TXOPs.

In some implementations, the second WLAN device may use the second sub-TXOP to assign resources (such as time, resource units, sub-channels, or the like) for STAs associated with a BSS managed by the second WLAN device.

In some implementations, determining that the first WLAN device is the owner of the first mTXOP may include the first WLAN device winning a contention-based procedure for the first mTXOP. The contention-based procedure may occur during one of a plurality of contention windows of the wireless channel, and the plurality of contention windows may occur at predetermined times. For example, the plurality of contention windows may be synchronized among neighbor APs that share the wireless channel.

In some implementations, the first WLAN device may prepare the allocation based on scheduling information from neighboring APs. For example, the first AP may receive scheduling information from at least the second WLAN device. The scheduling information may include a back-off counter, buffer status information, a resource request, a latency parameter, a preferred sub-TXOP duration, or any combination thereof. The first WLAN device may attempt to fairly allocate the sub-TXOPs based on scheduling information from multiple neighboring WLAN device.

Figure 15:
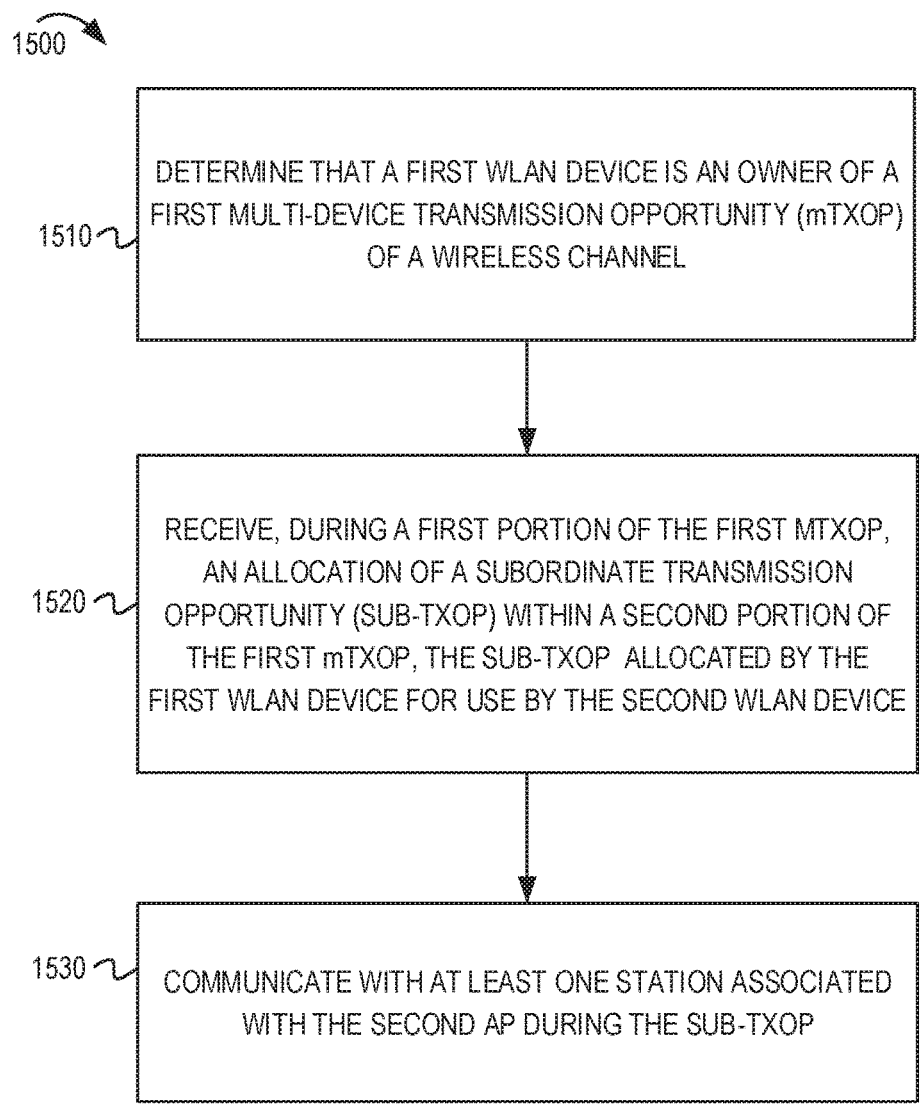
FIG. 15 shows a flowchart illustrating an example process for mTXOP sharing performed by a second WLAN device.

FIG. 15 shows a flowchart illustrating an example process 1500 for mTXOP sharing performed by a second WLAN device. In some implementations, the process 1500 may be performed by a neighboring AP, such as the second AP 120 in the examples of this disclosure. In some implementations, the process 1500 begins in block 1510 with the second WLAN device determining that a first WLAN device is an owner of a first multi-device transmission opportunity (mTXOP) of a wireless channel.

In block 1520, the process 1500 proceeds with the second WLAN device receiving, during a first portion of the first mTXOP, an allocation of a subordinate transmission opportunity (sub-TXOP) within a second portion of the first mTXOP. The sub-TXOP having been allocated by the first WLAN device for use by the second WLAN device. In block 1530, the process 1500 proceeds with communicating with at least one station associated with the second WLAN device during the sub-TXOP.

In some implementations, the second WLAN device may output scheduling information for transmission from the second WLAN device to the first in response to a MAP-Sch-Trigger message. The scheduling information may include a back-off counter, buffer status information, a resource request, a latency parameter, a preferred sub-TXOP duration, or any combination thereof.

FIG. 16 shows a flowchart illustrating an example process 1600 for mTXOP sharing performed by a STA associated with an mTXOP owner. In some implementations, the process 1600 may be performed by a first STA associated with a first AP (which is an mTXOP owner). In some implementations, the process 1600 begins in block 1610 with receiving, during a first portion of a first multi-device transmission opportunity (mTXOP), an allocation of a first subordinate transmission opportunity (sub-TXOP) within a second portion of the first mTXOP.

In block 1620, the process 1600 proceeds with communicating with the first AP during the first sub-TXOP.

In some implementation, the process may also include the STA refraining from communicating during the second sub-TXOP.

Figure 17:
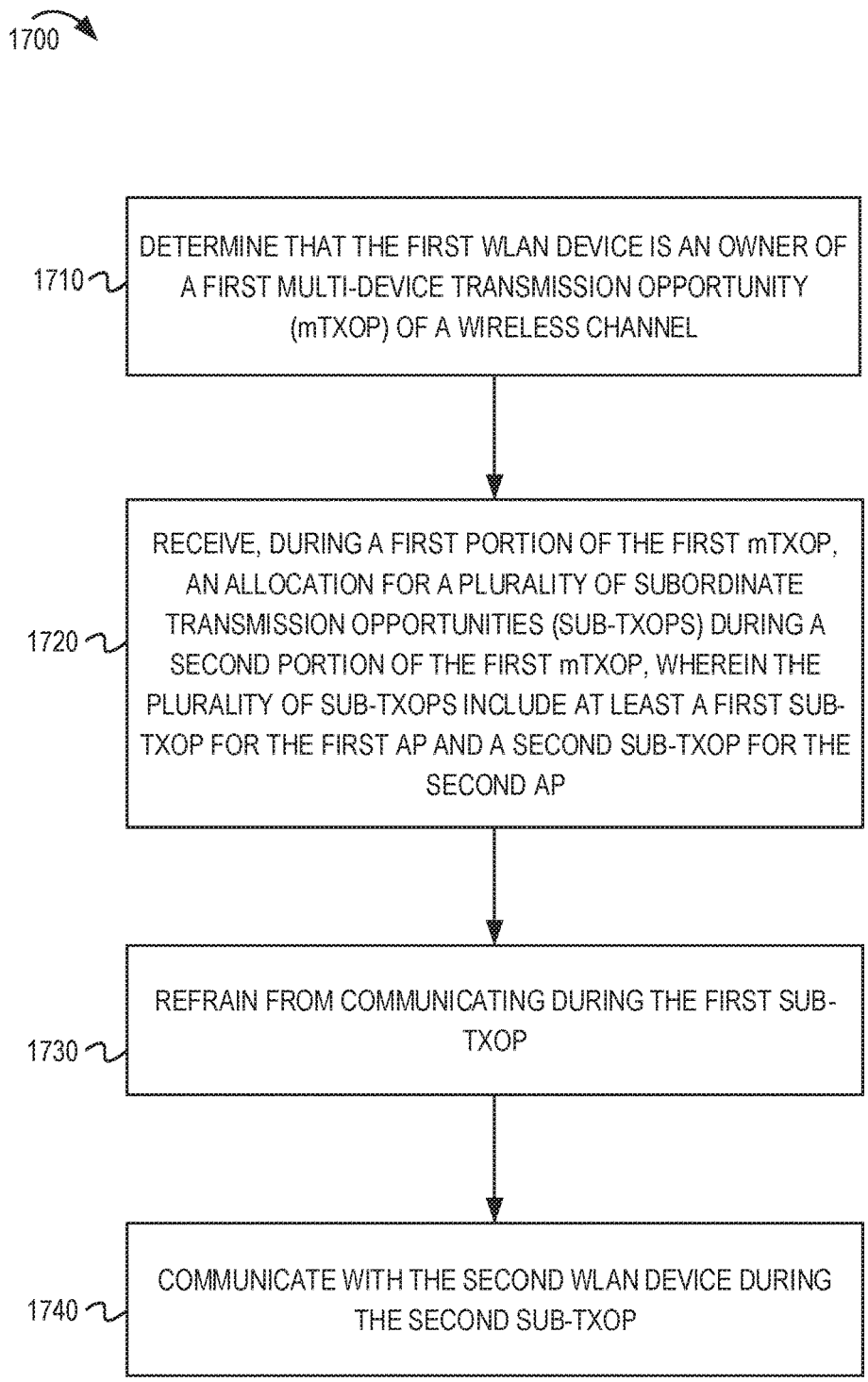
FIG. 17 shows a flowchart illustrating an example process for mTXOP sharing performed by a STA associated with neighboring AP.

FIG. 17 shows a flowchart illustrating an example process 1700 for mTXOP sharing performed by a STA associated with neighboring AP. In some implementations, the process 1700 may be performed by a second STA associated with a second AP (which is not an mTXOP owner). In the example of this figure a first AP is the mTXOP owner. In some implementations, the process 1700 begins in block 1710 with determining that the first WLAN device is an owner of a first mTXOP of a wireless channel.

In block 1720, the process 1700 proceeds with receiving, during a first portion of the first mTXOP, an allocation for a plurality of subordinate transmission opportunities (sub-TXOPs) during a second portion of the first mTXOP. The plurality of sub-TXOPs may include at least a first sub-TXOP for the first WLAN device and a second sub-TXOP for the second WLAN device.

In block 1730, the process 1700 proceeds with refraining from communicating during the first sub-TXOP.

In block 1740, the process 1700 proceeds with communicating with the second WLAN device during the second sub-TXOP.

Figure 18:
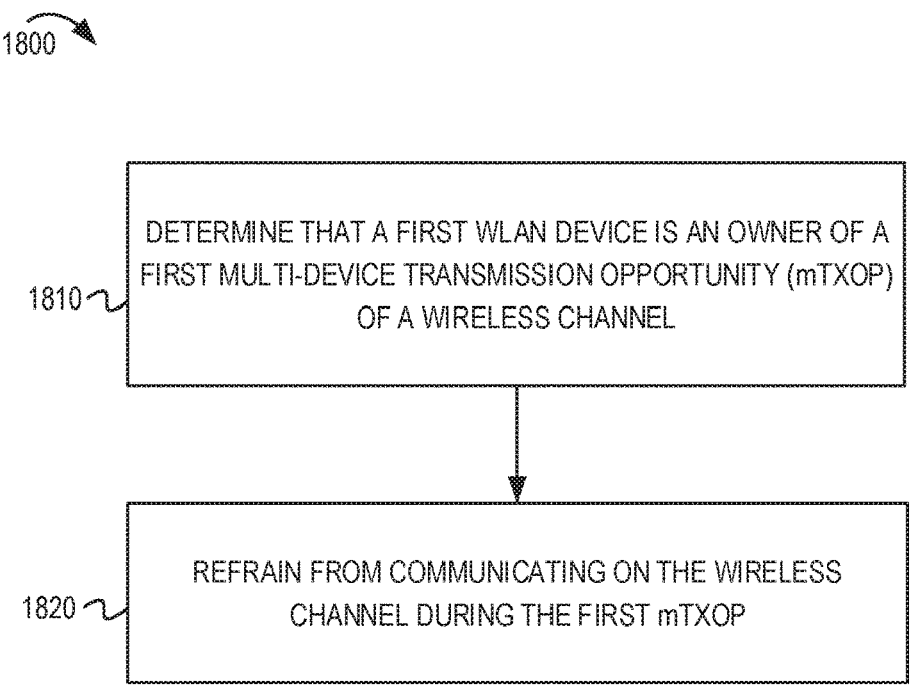
FIG. 18 shows a flowchart illustrating an example process for mTXOP sharing performed by a wireless wide area network (WWAN) device.

FIG. 18 shows a flowchart illustrating an example process 1800 for mTXOP sharing performed by a WWAN device. In the example of FIG. 18, the WWAN device is not the mTXOP owner. In some implementations, the process 1800 begins in block 1810 with the WWAN device determining that a first WLAN device is an owner of a first multi-device transmission opportunity (mTXOP) of a wireless channel; and In block 1820, the process 1800 proceeds with the WWAN device refraining from communicating on the wireless channel during the first mTXOP.

FIGS. 1-18 and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed at a first access point (AP), comprising:
   determining that the first AP is an owner of a first multi-device transmission opportunity (mTXOP) of a wireless channel based on the first AP winning a contention-based procedure for the first mTXOP, the contention-based procedure occurring during one of a plurality of contention windows of the wireless channel, the plurality of contention windows synchronized among neighboring wireless local area network (WLAN) devices that share the wireless channel;
   determining, during a first portion of the first mTXOP, an allocation of subordinate transmission opportunities (sub-TXOPs) within a second portion of the first mTXOP, wherein the allocation of sub-TXOPs include at least a first sub-TXOP allocated for the first AP and a second sub-TXOP allocated for a second AP; and
   communicating the allocation to at least the second AP via the wireless channel.

2. The method of claim 1, wherein the sub-TXOPs represent a time-division multiplexing schedule within the second portion of the first mTXOP.

3. The method of claim 1, wherein the sub-TXOPs are frequency-division multiplexed resources within the second portion of the first mTXOP.

4. The method of claim 1, wherein determining the allocation includes allocating one or more resource units within the second portion of the first mTXOP to form the sub-TXOPs.

5. The method of claim 1, further comprising:
   communicating with at least a first station (STA) during the first sub-TXOP; and
   permitting the second AP to communicate with at least a second STA associated with the second AP during the second sub-TXOP.

6. The method of claim 1, wherein determining the allocation of sub-TXOPs includes:
   communicating a multi-AP scheduling trigger (MAP-Sch-Trigger) message during the first portion of the first mTXOP;
   receiving scheduling information from at least the second AP in response to communicating the MAP-Sch-Trigger message, wherein the scheduling information includes at least one member selected from a group consisting of a back-off counter, buffer status information, a resource request, a latency parameter, and a preferred sub-TXOP duration; and
allocating the second sub-TXOP for the second AP based, at least in part, on the scheduling information from the second AP.

7. The method of claim 1, wherein determining the allocation of sub-TXOPs includes distributing allocations for the sub-TXOPs to multiple WLAN devices based, at least in part, on a fairness algorithm that takes into account a history of mTXOP sharing by the multiple WLAN devices.

8. The method of claim 1, further comprising:
determining that the second AP has a latency consideration associated with one or more communications between the second AP and at least one STA associated with the second AP; and
allocating two or more non-consecutive sub-TXOPs for the second AP in response to determining that the second AP has the latency consideration.

9. The method of claim 8, wherein the latency consideration is associated with a media stream, and wherein the two or more non-consecutive sub-TXOPs are based, at least in part, on a quality of service for the media stream.

10. The method of claim 1, wherein communicating the allocation includes communicating at least one of an identifier associated with the second AP or a resource assignment of the second sub-TXOP allocated for the second AP.

11. The method of claim 1, wherein communicating the allocation includes communicating timing information for at least the second sub-TXOP, the timing information including at least a beginning time of the second sub-TXOP allocated for the second AP.

12. The method of claim 1, further comprising communicating a sub-TXOP trigger message to indicate a start of the second portion of the first mTXOP.

13. The method of claim 1, determining the allocation of sub-TXOPs includes allocating a third sub-TXOP for opportunistic access by one or more STAs in a basic service set (BSS) managed by either the first AP or the second AP.

14. The method of claim 1, further comprising refraining from being an owner of a second mTXOP after the first mTXOP to allow another WLAN device to become the owner of the second mTXOP, wherein refraining from being the owner of the second mTXOP includes resetting a back-off counter of the first AP after the first mTXOP.

15. The method of claim 1, wherein determining the allocation of sub-TXOPs includes allocating a third sub-TXOP to a wireless wide area network (WWAN) device that shares the wireless channel using a WWAN communication protocol.

16. A first apparatus for wireless communications, comprising:
at least one processor;
a memory comprising instructions executable by the at least one processor to cause the first apparatus to:
determine that the first apparatus is an owner of a first multi-device transmission opportunity (mTXOP) of a wireless channel based on the first apparatus winning a contention-based procedure for the first mTXOP, the contention-based procedure occurring during one of a plurality of contention windows of the wireless channel, the plurality of contention windows synchronized among neighboring wireless local area network (WLAN) devices that share the wireless channel; and
determine, during a first portion of the first mTXOP, an allocation of subordinate transmission opportunities (sub-TXOPs) within a second portion of the first mTXOP, wherein the allocation of sub-TXOPs include at least a first sub-TXOP allocated for the first apparatus and a second sub-TXOP allocated for a second apparatus; and
an interface coupled with the at least one processor and configured to:
output the allocation for transmission to at least the second apparatus via the wireless channel.

17. The first apparatus of claim 16, wherein:
the interface is further configured to output communications for transmission to at least a first station (STA) during the first sub-TXOP; and
the at least one processor is further configured to execute the instructions and cause the first apparatus to permit the second apparatus to communicate with at least a second STA associated with the second apparatus during the second sub-TXOP.

18. The first apparatus of claim 16, wherein:
the interface is further configured to:
output a multi-AP scheduling trigger (MAP-Sch-Trigger) message for transmission during the first portion of the first mTXOP; and
obtain scheduling information from at least the second apparatus in response to the transmission of the MAP-Sch-Trigger message, wherein the scheduling information includes at least one member selected from a group consisting of a back-off counter, buffer status information, a resource request, a latency parameter, and a preferred sub-TXOP duration; and
the at least one processor is further configured to execute the instructions and cause the first apparatus to:
allocate the second sub-TXOP for the second apparatus based, at least in part, on the scheduling information from the second apparatus.

19. The first apparatus of claim 16, wherein the interface configured to output the allocation for transmission includes the interface being configured to output for transmission at least one of an identifier associated with the second apparatus or a resource assignment of the second sub-TXOP allocated for the second apparatus, and wherein the resource assignment includes at least one member selected from a group consisting of a duration limit, a bandwidth limit, a frequency range, and a resource unit.

20. The first apparatus of claim 16, wherein the interface configured to output the allocation for transmission includes the interface being configured to output for transmission timing information for at least the second sub-TXOP, the timing information including at least a beginning time of the second sub-TXOP allocated for the second apparatus.

21. The first apparatus of claim 16, wherein the at least one processor configured to execute the instructions and cause the first apparatus to determine the allocation of sub-TXOPs includes the first apparatus allocating a third sub-TXOP to a wireless wide area network (WWAN) device that shares the wireless channel using a WWAN communication protocol.

22. The first apparatus of claim 16, further comprising:
a transceiver configured to transmit the allocation via the wireless channel, wherein the first apparatus is configured as an access point (AP).

23. A second apparatus for wireless communication, comprising:
at least one processor;
a memory comprising instructions executable by the at least one processor to cause the second apparatus to:

determine that a first apparatus is an owner of a first multi-device transmission opportunity (mTXOP) of a wireless channel based on the first apparatus winning a contention-based procedure for the first mTXOP, the contention-based procedure occurring during one of a plurality of contention windows of the wireless channel, the plurality of contention windows synchronized among neighboring wireless local area network (WLAN) devices that share the wireless channel; and an interface coupled with the at least one processor and configured to:

obtain, during a first portion of the first mTXOP, an allocation of a subordinate transmission opportunity (sub-TXOP) within a second portion of the first mTXOP, the sub-TXOP allocated by the first apparatus for use by the second apparatus; and output communications for transmission to at least one station (STA) during the sub-TXOP.

24. The second apparatus of claim 23, wherein the interface is further configured to:

obtain a multi-AP scheduling trigger (MAP-Sch-Trigger) message from the first apparatus during the first portion of the first mTXOP; and output scheduling information for transmission from the second apparatus to the first apparatus in response to the MAP-Sch-Trigger message.

25. The second apparatus of claim 23, wherein the at least one processor is further configured to execute the instructions and cause the second apparatus to reset a back-off counter of the second apparatus after the communications with the at least one STA during the sub-TXOP.

26. The second apparatus of claim 23, further comprising a transceiver configured to:

receive the allocation of the sub-TXOP; and transmit the communications during the sub-TXOP, wherein the second apparatus is configured as an access point (AP).

27. A first apparatus, comprising:

at least one processor;

a memory comprising instructions executable by the at least one processor to cause the first apparatus to generate communications for transmission via a wireless channel; and an interface coupled with the at least one processor and configured to:

obtain, from a first access point (AP) during a first portion of a first multi-device transmission opportunity (mTXOP) of the wireless channel, an allocation of a first subordinate transmission opportunity (sub-TXOP) within a second portion of the first mTXOP, the first AP being an owner of the mTXOP based on winning a contention-based procedure for the first mTXOP, the contention-based procedure occurring during one of a plurality of contention windows of the wireless channel, the plurality of contention windows synchronized among neighboring wireless local area network (WLAN) devices that share the wireless channel; and output the communications for transmission to the first AP during the first sub-TXOP.

28. The first apparatus of claim 27, wherein the at least one processor is further configured to execute the instructions and cause the first apparatus to:

determine that a second sub-TXOP is allocated to a different WLAN device other than the first apparatus; and enter a sleep state during the second sub-TXOP.

29. The first apparatus of claim 27, wherein:

the at least one processor is further configured to execute the instructions and cause the first apparatus to determine that a third sub-TXOP is allocated by the first AP for opportunistic access by the first apparatus; and the interface is configured to output the communications from the first apparatus to the first AP or to another WLAN device during the third sub-TXOP.

30. The first apparatus of claim 27, further comprising a transceiver configured to:

receive the allocation of the first sub-TXOP; and transmit the communications during the first sub-TXOP, wherein the first apparatus is configured as a station (STA).

* * * * *